(12) United States Patent
Auner et al.

(10) Patent No.: US 11,691,883 B2
(45) Date of Patent: Jul. 4, 2023

(54) SYNTHESIS OF TRICHLOROSILANE FROM TETRACHLOROSILANE AND HYDRIDOSILANES

(71) Applicant: MOMENTIVE PERFORMANCE MATERIALS INC., Waterford, NY (US)

(72) Inventors: Norbert Auner, Glashütten (DE); Alexander G Sturm, Mainz (DE)

(73) Assignee: Momentive Performance Materials Inc., Waterford, NY (US)

( * ) Notice: Subject to any disclaimer, the term of this patent is extended or adjusted under 35 U.S.C. 154(b) by 151 days.

(21) Appl. No.: 17/273,796

(22) PCT Filed: Sep. 5, 2019

(86) PCT No.: PCT/US2019/049685
§ 371 (c)(1),
(2) Date: Mar. 5, 2021

(87) PCT Pub. No.: WO2020/055656
PCT Pub. Date: Mar. 19, 2020

(65) Prior Publication Data
US 2021/0246037 A1 Aug. 12, 2021

(30) Foreign Application Priority Data
Sep. 10, 2018 (EP) .................................. 18193571

(51) Int. Cl.
| C01B 33/107 | (2006.01) |
| B01J 14/00 | (2006.01) |
| B01J 23/72 | (2006.01) |

(52) U.S. Cl.
CPC ......... *C01B 33/1071* (2013.01); *B01J 14/005* (2013.01); *B01J 23/72* (2013.01)

(58) Field of Classification Search
CPC ...... C01B 33/1071; B01J 14/005; B01J 23/72
See application file for complete search history.

(56) References Cited

U.S. PATENT DOCUMENTS

| 5,118,485 A | 6/1992 | Arvidson et al. |
| 7,442,824 B2 | 10/2008 | Paetzold et al. |
| 2008/0112875 A1 | 5/2008 | Garcia-Alonso et al. |
| 2013/0001063 A1 | 1/2013 | Tanaka et al. |
| 2013/0216464 A1 | 8/2013 | Stochniol et al. |

(Continued)

FOREIGN PATENT DOCUMENTS

| DE | 1080077 B | 4/1960 |
| DE | 102015105501 A1 | 10/2016 |
| EP | 0334664 A2 | 9/1989 |

(Continued)

OTHER PUBLICATIONS

International Search Report and Written Opinion from PCT/US2019/049685 dated Dec. 12, 2019.

(Continued)

*Primary Examiner* — Anthony J Zimmer
*Assistant Examiner* — Logan Edward Laclair
(74) *Attorney, Agent, or Firm* — James C Abruzzo (57) ABSTRACT

The invention relates to a process for the preparation of trichlorosilane (HSiCl3) which comprises the reaction of tetrachlorosilane (SiCl4) with hydridosilanes in the presence of a catalyst.

17 Claims, 1 Drawing Sheet

HSiCl₃ formation from Me₃SiH (above, Table 2 entry b) and MeSiH₃ (down, Table 2 entry a).

(56) References Cited

U.S. PATENT DOCUMENTS

2016/0002052 A1* 1/2016 Ishida ............... C01B 33/1071
423/342
2017/0369325 A1 12/2017 Ishida et al.

FOREIGN PATENT DOCUMENTS

EP 2546197 A1 1/2013
JP 2000178019 A * 6/2000

OTHER PUBLICATIONS

B. Ceccaroli, O. Lohne, Handbook of photovoltaic Science and Engineering, Solar Grade Silicon Feedstock, Edited by A. Luque and S. Hegedus 2003, 167-172.
(Hollemann-Wiberg, Lehrbuch der Anorganischen Chemie, 102. Auflage, Walter de Gruyter, Berlin, New York, 2007, S. 938 (Textbook of Inorganic Chemistry).
H. Jacob, Prax. Naturwiss. Chem. 1988, 37, 4; K. Bohmhammel, G. Roewer, H. Walter, J. Chem. Soc. Faraday trans. 1995, 91, 3879-3882.
Gas-Dynamic and Thermal Process in the Synthesis of Trichlorosilane by Hydrogen Reduction of Silicon Tetrachloride in a High-Frequency Discharge: R. A. Kornev, V. A. Shaposhnikov, A. M. Kuz'min in: Russian Journal of Applied Chemistry 2014, 87 (9), 1246-1250.
Catalytic conversion of silicon tetrachloride to trichlorosilane for a poly-Si process: J. Y. Lee, W. H. Lee, Y.-Ki Park, H. Y. Kim, N. Y. Kang, K. B. Yoon, W. C. Choi, O-Bong Yang, in: Solar Energy Materials and Solar cells 105 (2012) 142-147 (Use of carbon-based catalysts (metal-carbon composite catalyst in a continuous-flow fixed-bed reactor) T~650 ° C., yield HSICl3 8-20%).
Preparation of Trichlorosilane from Hydrogenation of Silicontetrachloride in Thermal Plasma: W. Qingyou, C. Hanbin, L. Yuliang, T. Xumei, H. Zhijun, S. Shuyong, Y. Yongxiang, D. Xiaoyan, In: Inorganic Materials 2010, 46 (3), 251-254. (Yield HSICl3 was ~70% (max), average yield ~60%, energy: ~3.2 kWh/kg for HSICl3).
Base-Catalyzed Hydrogenation of Chlorosilanes by Organotin Hydrides: U. Pätzold, G. Roewer in: Organosilicon Chemistry II, N. Auner, J. Weiss (editors), VCH 1996, 55-62.
H. J. Klockner, M. Eschwey, Chem.-Ing.-Tech. 1988, 60, 815-821.
Base-Catalyzed Hydrogenation of Chlorosilanes by Organotin Hydrides: U. Pätzold, G. Roewer in: Organosilicon Chemistry II, N. Auner, J. Weiss (editors); J. of Organomet. Chem. 1996, 508, 147-152.
W. Sundermeyer, L. M. Litz, Chemie-Ing.-Tech. 1965, 37, 14-18.
A.N. Kornev, V. V. Semenov, Organomet. Chem. in the USSR 4 (4), 420-422, 199.
N. Kornev, V. V. Semenov, Metalloorg. Khim. 1991, 4, 860-863.
A. R. Gilbert, G. D. Cooper, R. W. Shade, Industrial and Engineering Chemistry 51, 5, 665-668, 1959.
Mechanism of the silicide-catalyzed hydrodehalogenation of silicon tetrachloride to trichlorosilane: H. Walter, G. Roewer, K. Bohmhammel, in: J. Chem. Soc. Faraday Trans. 1996, 92 (22), 4605-4608 (conversion rate ~15%, T=600° .C.).
Hydrodehalogenation of Chlorosilanes in the Presence of Metal Silicides: Experimental Studies of Gas and Solid Phase Composition related to Thermodynamic Calculations: K. Bohmhammel, G. Roewer, H. Walter. In: J. Chem. Soc. Faraday Trans. 1995, 91 (21), 3879-3882.

* cited by examiner

Figure 1) HSiCl$_3$ formation from Me$_3$SiH (above, Table 2 entry b) and MeSiH$_3$ (down, Table 2 entry a).

Figure 2) HSiCl$_3$ formation from Me$_2$SiH$_2$ to yield Me$_2$SiCl$_2$ (above, Table 2 entry e) and Me$_2$SiHCl (down, Table 2 entry g).

SYNTHESIS OF TRICHLOROSILANE FROM TETRACHLOROSILANE AND HYDRIDOSILANES

CROSS-REFERENCE TO RELATED APPLICATIONS

The present application is a U.S. National Phase Application of PCT International Application No. PCT/US2019/049685, filed on Sep. 5, 2019, to which priority is claimed from EP Patent Application No. 18193571.9, filed Sep. 10, 2018 which is incorporated herein by reference in its entirety.

STATE OF THE ART

Trichlorosilane is conventionally produced by treating powdered metallurgical grade silicon with blowing hydrogen chloride at 300° C.:

$$Si+3\ HCl \rightarrow HSiCl_3+H_2.$$

Yields of 80-90% can be achieved. It is an important intermediate in the production of solar silicon where the trichlorosilane is distilled in a complex process and decomposed on heated hyperpure silicon rods to silicon, silicon tetrachloride and hydrogen chloride:

$$2\ HSiCl_3 \rightarrow Si+SiCl_4+2\ HCl.$$

Trichlorosilane is also produced from silicon tetrachloride:

$$3\ SiCl_4+Si+2H_2 \rightarrow 4\ HSiCl_3(+H_2SiCl_2+HCl)$$

at a temperature of T=500° C. (with a thermodynamically limited yield of 20%).

In the Bayer Process, $SiCl_4$ is reacted with activated carbon or activated carbon supported transition metals and barium as promotor at 1=600-900° C. with a $SiCl_4/HSiCl_3$ conversion rate ~15%.

For the reaction of $SiCl_4+H_2 \rightarrow HSiCl_3+HCl$ temperatures >1000° C. are required, the conversion rate is ~20%, the energy consumption is ~1.3 kWh/kg $SiCl_4$ conversion (http://www.gtsolar.com)

Non-industrial procedures are described e.g. in the following scientific documents:

a) Preparation of Trichlorosilane from Hydrogenation of Silicontetrachloride in Thermal Plasma: W. Qingyou, C. Hanbin, L. Yuliang, T. Xumei, H. Zhijun, S. Shuyong, Y. Yongxiang, D. Xiaoyan, In: Inorganic Materials 2010, 46 (3), 251-254. (Yield $HSiCl_3$ was ~70% (max), average yield ~60%, energy: ~3.2 kWh/kg for $HSiCl_3$).

b) Gas-Dynamic and Thermal Process in the Synthesis of Trichlorosilane by Hydrogen Reduction of Silicon Tetrachloride in a High-Frequency Discharge: R. A. Kornev, V. A. Shaposhnikov, A. M. Kuz'min in: Russian Journal of Applied Chemistry 2014, 87 (9), 1246-1250.

c) Mechanism of the silicide-catalyzed hydrodehalogenation of silicon tetrachloride to trichlorosilane: H. Walter, G. Roewer, K. Bohmhammel, in: J. Chem. Soc. Faraday Trans. 1996, 92 (22), 4605-4608 (conversion rate ~15%, T=600° C.).

d) Hydrodehalogenation of Chlorosilanes in the Presence of Metal Silicides: Experimental Studies of Gas and Solid Phase Composition related to Thermodynamic Calculations: K. Bohmhammel, G. Roewer, H. Walter. In: J. Chem. Soc. Faraday Trans. 1995, 91 (21), 3879-3882.

e) Catalytic conversion of silicon tetrachloride to trichlorosilane for a poly-Si process: J. Y. Lee, W. H. Lee, Y.-Ki Park, H. Y. Kim, N. Y. Kang, K. B. Yoon, W. C. Choi, O-Bong Yang, in: Solar Energy Materials and Solar cells 105 (2012) 142-147 (Use of carbon-based catalysts (metal-carbon composite catalyst in a continuous-flow fixed-bed reactor) T~650° C., yield $HSiCl_3$ 8-20%).

f) Base-Catalyzed Hydrogenation of Chlorosilanes by Organotin Hydrides: U. Pätzold, G. Roewer in: Organosilicon Chemistry II, N. Auner, J. Weiss (editors), VCH 1996, 55-62; J. of Organomet. Chem. 1996, 508, 147-152 ($SiCl_4$+$Bu_3SnH \rightarrow HSiCl_3+SiH_4$ (+$H_2SiCl_2+H_3SiCl$), where $R_4PCl$, and $R_4NCl$ are suitable as catalysts to get the explosive $SiH_4$). However, tin hydrides are very toxic and not suitable for industrial use.

Patent publications related to the production of trichlorosilane include e.g. U.S. Pat. No. 7,442,824 B2, US2008/0112875 A1, US2013/0216464 A1, US2016/0002052 A1, US2017/0369325 A1.

Technical Problems

A preparatively facile conversion of $SiCl_4$ into $HSiCl_3$ in high yields is an economic necessity (B. Ceccaroli, O. Lohne, Handbook of photovoltaic Science and Engineering, Solar Grade Silicon Feedstock, Edited by A. Luque and S. Hegedus 2003, 167-172). Most desirable would be a selective monohydrogenation of $SiCl_4$ to give $HSiCl_3$, however, reduction of $SiCl_4$ with common reducing agents, e.g. LiH (W. Sundermeyer DE1080077B, 1957; W. Sundermeyer, L. M. Litz, Chemie-Ing.-Tech. 1965, 37, 14-18; H. J. Klockner, M. Eschwey, Chem.-Ing.-Tech. 1988, 60, 815-821) and $LiAlH_4$ (Hollemann-Wiberg, Handbuch der Anorganischen Chemie, 102. Auflage, Walter de Gruyter, Berlin, N.Y., 2007, S. 938), gives the perhydrogenated $SiH_4$ quantitatively lacking in any selectivity towards $HSiCl_3$.

In the conventional process of manufacturing $HSiCl_3$, silicon is reacted with gaseous HCl in a Direct Process in a fluidized bed reactor at 300-450° C. in large scale: $Si+3\ HCl \rightarrow HSiCl_3$ (80%)+$SiCl_4$ (20%)+$H_2$. A tremendous amount of $SiCl_4$ is formed which is recovered since the late 1970s according to: $Si+3\ SiCl_{4+2}\ H_2 \rightarrow 4\ HSiCl_3$ (T=500° C., yield 20%).

From the Direct Synthesis $HSiCl_3$ is contaminated with electronically active impurities such as chlorides of boron, phosphorous and arsenic along with traces of hydrocarbons. Performing the $HSiCl_3$ deposition to give silicon and HCl in the Siemens Process, only one third of silicon is converted to polysilicon, but one third is converted to $SiCl_4$ and one third is unconverted in the decomposition leaving the reactor exhaust gas which still contains HCl. The $HSiCl_3$ formation is dependent from silicon quality: technical grade silicon requires higher temperatures but produces more $SiCl_4$ simultaneously. Pure and highly pure silicon produces lesser amounts of $SiCl_4$ but increase overall costs drastically. At higher temperatures $H_2SiCl_2$ forms from disproportionation of $HSiCl_3$ (and gives $SiCl_4$!). Thus, silicon impurities catalyze $SiCl_4$ formation. Summarizing, technical processes to produce semiconductor silicon are based on CVD (chemical vapor deposition) of chlorosilanes or silanes. The process based on chlorosilanes have the common effect that only ca. 25% of the chlorosilane used is converted into the final silicon product, but 75% is converted into the by-product silicon tetrachloride ($SiCl_4$). As 75% of the world wide hyper pure silicon production is based on the Siemens Process using $HSiCl_3$ as starting material, it is the major factor for economics to profitably dispose $SiCl_4$, which mostly is converted to fumed silica ($SiO_2$) upon hydrolysis at high temperatures and thus reducing economic benefit (H.

Jacob, Prax. Naturwiss. Chem. 1988, 37, 4; K. Bohmhammel, G. Roewer, H. Walter, J. Chem. Soc. Faraday trans. 1995, 91, 3879-3882). Until now intensive efforts to convert SiCl$_4$ into HSiCl$_3$ were concentrated on the development of processes of homogenous gas-phase hydrogenation at 1200° C. and of hydrogenation in the presence of metallurgical silicon at 600° C. Much work was investigated in the hydrodehalogenation of chlorosilanes in the presence of metal silicides (H. Walter, G. Roewer, K. Bohmhammel, J. Chem. Soc. Faraday Trans. 1996, 92, 4605-4608), but reaction temperatures for HSiCl$_3$ recovery were high (~600° C.) and yields were low (conversion rates SiCl$_4$/HSiCl$_3$ 4-7 mol %). The technically preferred reaction 3 SiCl$_4$+Si+2H$_2$→4 HSiCl$_3$ (+H$_2$SiCl$_2$+HCl) is performed at 500° C. with a thermodynamically limited yield of 20%. In the Bayer Process SiCl$_4$ is reacted with activated carbon or activated carbon supported transition metals and Ba (barium) as promotor at temperatures between 600° C. and 900° C. with a SiCl$_4$/HSiCl$_3$ conversion rate of ~15%. For the reaction of SiCl$_4$+H$_2$→4 HSiCl$_3$+HCl temperatures >1000° C. are required, the conversion rate is ~20%, the energy consumption is ~1.3 kWh/kg SiCl$_4$ conversion (http://www.gtsolar.com).

Accordingly, there has been a strong demand for an economically viable process for selectively preparing trichlorosilane in high yields from easily available starting materials, which process is energy saving, proceeds at low temperatures, and which allows a simple separation of the trichlorosilane from by-products.

DESCRIPTION OF THE INVENTION

The present inventors discovered that trichlorosilane can be prepared in high yields from tetrachlorosilanes and hydridosilanes, which process is energy saving, proceeds at low temperatures, and allows a simple separation of the trichlorosilane from by-products.

In accordance with the present invention, a process for the preparation of trichlorosilane (HSiCl$_3$) is provided which comprises the reaction of tetrachlorosilane (SiCl$_4$) with hydridosilanes in the presence of a catalyst.

In a preferred embodiment of the present invention, the hydridosilanes are selected from the group consisting of the formulae:

(1), and (2), wherein
R is an organic group,
X is halogen or alkoxy,
n is 0 to 3, preferably 1 to 3, more preferably 2,
m is 0 to 2, preferably 0, and
n+m=0 to 3, preferably 1 to 3, more preferably 2,
o is 0 to 5, preferably 1 to 5,
p is 0 to 5, preferably 0, and
o+p=1 to 5.

In the above formulae (1) and (2), R is preferably selected from aromatic or aliphatic hydrocarbon groups preferably with up to 6 carbon atoms, preferably from C1 to C6 alkyl groups or C2 to C6 alkenyl groups, more preferably from C1 to C4 alkyl groups.

Organic of organyl groups R can be the same or different, and preferably R includes an aromatic group, such as phenyl, tolyl, and/or an aliphatic hydrocarbon group, more preferably R is an alkyl group, such as methyl, ethyl, n-, or iso-propyl, n-butyl, sec-butyl, iso-butyl, tert-butyl, n-pentyl, tert-pentyl, neopentyl, iso-pentyl, sec-pentyl, n-, iso- or sec-hexyl n-, iso- or sec-heptyl, n-, iso- or sec-octyl etc., even more preferably R is a n-alkyl group, or R is an alkenyl group.

More preferred groups R are selected from the group of Me=methyl, Et=ethyl, Vi=vinyl, n-Pr=n-propyl, i-Pr=iso-propyl, allyl, t-Bu=tert-butyl, n-Bu=n-butyl, Hex=n-hexyl, Ph=phenyl, p-Tol=para-tolyl, Bz=benzyl, and Mes=mesityl, or mixtures thereof. Most preferred R is a methyl group.

X is a halogen atom, preferably chlorine or bromine, more preferably chlorine or an alkoxy group such as C1 to C6 alkoxy, preferably methoxy or ethoxy.

Preferably the hydridosilanes are selected from the group consisting of SiH$_4$, H$_3$SiCl, H$_2$SiCl$_2$, MeSiH$_3$, Me$_3$SiH, Me$_2$SiH$_2$, Et$_2$SiH$_2$, MeSiHCl$_2$, Me$_2$SiHCl, PhSiH$_3$, Ph$_2$SiH$_2$, PhMeSiH$_2$, Pr$_2$SiH$_2$, Hex$_2$SiH$_2$, tBu$_2$SiH$_2$, Me$_2$Si(OEt)H, ViSiH$_3$, ViMeSiH$_2$, Me$_2$HSi—SiHMe$_2$, MeH$_2$Si—SiH$_2$Me, MeH$_2$Si—SiHMe$_2$, Me$_3$Si—SiHMe$_2$, Me$_3$Si—SiH$_2$Me, H$_3$Si—SiH$_3$, HSi$_2$Cl$_5$, preferably Me$_2$SiH$_2$.

The process according to the invention is carried out in the presence of a catalyst, which promotes the selective reduction of the SiCl$_4$ to HSiCl$_3$. The catalyst is preferably selected from the group consisting of:

R$^1_4$QZ, wherein R$^1$ is independently selected from hydrogen or an organyl group (such as those described for R above), more preferably an aromatic group or aliphatic hydrocarbon group, even more preferably a n-alkyl group, and most preferably a n-butyl group, Q is phosphorus, nitrogen, arsenic, antimony or bismuth, and Z is halogen, phosphines of the formula R$^1_3$P, wherein R$^1$ is as defined above, preferably an organyl group (such as those described for R above), preferably PPh$_3$ or n-Bu$_3$P, amines of the formula R$^1_3$N, wherein R$^1$ is as defined above, preferably an organyl group (such as those described for R above), preferably n-Bu$_3$N or NPh$_3$, N-heterocyclic amines, preferably non-N-substituted methylimidazoles, such as 2-methylimidazole, and 4-methylimidazole, an alkali metal halide, such as LiCl, and an alkaline earth metal halide.

In a preferred embodiment of the invention the process for the preparation of trichlorosilane is carried out in the presence of a catalyst of the formula R$^1_4$QZ, wherein R$^1$ is an organyl group, more preferably an aliphatic hydrocarbon group, even more preferably a n-alkyl group, and most preferably a n-butyl group, Q is phosphorus or nitrogen, and Z is chlorine, Preferred catalysts are selected from the group consisting of:

quaternary ammonium or phosphonium compounds, such as

R$^1_4$PCl, wherein R$^1$ is hydrogen or an organyl group, which can be the same or different, more preferably an aromatic group or aliphatic hydrocarbon group, even more preferably a n-alkyl group, and most preferably a n-butyl group, such as n-Bu$_4$PCl, R$^1_4$NCl, wherein R$^1$ is hydrogen or an organyl group, which can be the same or different, more preferably an aromatic group or aliphatic hydrocarbon group, even more preferably a n-alkyl group, and most preferably a n-butyl group, such as n-Bu$_4$NCl, phosphines of the formula R$^1_3$P, wherein R$^1$ is hydrogen or an organyl group, preferably an organyl group, preferably the phosphine is PPh$_3$ or n-Bu$_3$P, amines of the formula R$^1_3$N, wherein R$^1$ is as defined above, preferably an organyl group, preferably the amine is n-Bu$_3$N or NPh$_3$, N-heterocyclic amines, preferably non-N-substituted methylimidazoles, such as 2-methylimidazole, and 4-methylimidazole, preferred are N-heterocyclic amines with a free nucleophilic electron pair at the nitrogen atom, which means that the nucleophilicity at the nitrogen atom in such N-heterocyclic amines is not reduced by inductive or mesomeric interactions. In particular, cyclic amides are normally not suitable as redistribution catalysts, an alkali metal halide, such as NaCl, KCl, LiCl, an alkaline earth metal halide, such as $MgCl_2$, $CaCl_2$).

Also a combination of two or more types of catalysts can be used.

Most preferred redistribution catalysts are selected from the compounds of the general formula $R^1_4PCl$, or $R^1_4NCl$, where $R^1$ is hydrogen or an organyl group and $R^1$ can be the same or different, preferably $R^1$ is an aromatic group such as R above, such as phenyl, tolyl, and/or an aliphatic hydrocarbon group, more preferably R is an alkyl group, such as methyl, ethyl, n-, or iso-propyl, n-butyl, sec-butyl, iso-butyl, tert-butyl, n-pentyl, tert-pentyl, neopentyl, iso-pentyl, sec-pentyl, n-, iso- or sec-hexyl n-, iso- or sec-heptyl, n-, iso- or sec-octyl etc., even more preferably R is a n-alkyl group, and most preferably the compound of the general formula $R_4PCl$ or $R_4NCl$ are n-$Bu_4PCl$ or n-$Bu_4NCl$.

Further preferred catalysts are selected from triorganophosphines $PR^1_3$, $R_1$ is hydrogen or an organyl group such as R above and $R^1$ can be the same or different, more preferably $R_1$ is an alkyl such as described before, cycloalkyl or aryl group, most preferably the organophosphine is $PPh_3$ or n-$Bu_3P$. Further preferred catalysts are selected from triorganoamines $NR^1_3$, $R_1$ is preferably an organyl group, more preferably R is an alkyl group, and most preferably the triorganoamine is n-$Bu_3N$ or $NPh_3$. Further preferred catalysts are N-heterocyclic amines such as non-N-substituted methylimidazoles such as 2-methylimidazole, and 4-methylimidazole, most preferably 2-methylimidazole.

Regarding the molar ratio of the catalyst in relation to the tetrachlorosilane it is preferably in the range of about 0.0001 mol-% to about 600 mol-%, more preferably about 0.01 mol-% to about 20 mol-%, even more preferably about 0.05 mol-% to about 2 mol-%, and most preferably about 0.05 mol-% to about 1 mol-%.

Herein, the molar ratio in % is defined as

[n (molar amount of the catalyst)/n (molar amount of the tetrachlorosilane)]×100. In another preferred embodiment according to the invention, the compounds of formula $R^1_4PCl$ are formed in situ from compounds of the formulae $R^1_3P$ and $R^1Cl$, wherein $R^1$ is H or an organyl group as defined above.

According to the invention, $R^1_4PCl$ or $R^1_4NCl$ can be also formed in situ, from $R^1_3P$ or $R^1_3N$ and $R^1Cl$ by combination of the compounds in the reaction vessel in which the reaction is performed.

In the present invention, n-$Bu_4PCl$ and n-$Bu_4NCl$ was found to be a particularly effective catalyst.

In a particularly preferred embodiment, the present invention relates to a process for the preparation of trichlorosilane by reacting tetrachlorosilane with dimethylsilane.

In a particular preferred embodiment the present invention relates to a process for the preparation of trichlorosilane, which comprises the reaction of tetrachlorosilane with dimethylsilane according to the reaction equations (I) or (II):

$Me_2SiH_2 + 2\ SiCl_4 \rightarrow 2\ HSiCl_3 + Me_2SiCl_2$ (I), $Me_2SiH_2 + SiCl_4 \rightarrow HSiCl_3 + Me_2SiHCl$ (II).

Accordingly, depending on whether the formation of $Me_2SiCl_2$ or $Me_2SiHCl$ is preferred, which are intermediates in the manufacture of silicones and functionalized silicones, the molar ratio can be selected suitably. Also in this particular process the catalysts are preferably selected from $R^1_4QZ$, as defined above, wherein $R^1$ is an organyl group, more preferably an aliphatic hydrocarbon group, even more preferably a n-alkyl group, and most preferably a n-butyl group, Q is phosphorus or nitrogen, and Z is chlorine, and most preferably the catalyst is selected from n-$Bu_4PCl$ and n-$Bu_4NCl$.

Another particularly preferred embodiment of the present invention relates to the process of reacting $Me_3SiH + SiCl_4 \rightarrow Me_3SiCl + HSiCl_3$.

The process for the preparation of trichlorosilane according to the invention, can be carried out in the presence or absence of a solvent. If a solvent is used the process of the present invention is carried out in the presence of one or more solvents, preferably selected from ether solvents. According to the present invention, the ether solvents can be selected from ether compounds, preferably selected from the group consisting of linear and cyclic aliphatic ether compounds. In the present invention, the term "ether compound" shall mean any organic compound containing an ether group —O—, in particular of formula $R^2$—O—$R^3$, wherein $R^2$ and $R^3$ are independently selected from an organyl group R such as those mentioned above. Preferably, in the present invention in general R represents an organyl group, which is bound to the silicon atom via a carbon atom, and which organyl group can be the same or different. Preferably the organyl group is an optionally substituted, more preferably unsubstituted group, which is selected from the groups consisting of: alkyl, aryl, alkenyl, alkynyl, alkaryl, aralkyl, aralkenyl, aralkynyl, cycloalkyl, cycloalkenyl, cycloalkynyl, cycloaralkyl, cycloaralkenyl, and cycloaralkynyl, even more preferably selected from alkyl, cycloalkyl, alkenyl and aryl, even further preferred selected from methyl, vinyl and phenyl, and most preferably R is a methyl group (herein abbreviated as Me).

Preferably, $R^2$ and $R^3$ are substituted or unsubstituted linear or branched alkyl groups or aryl groups, which may have further heteroatoms such as oxygen, nitrogen, or sulfur. In the case of cyclic ether compounds, $R^2$ and $R^3$ can constitute together an optionally substituted alkylene or arylene group, which may have further heteroatoms such as oxygen, nitrogen, or sulfur. The ether compounds can be symmetrical or asymmetrical with respect to the substituents at the ether group —O—. Also a mixture of one or more ether compounds and one or more non-ether compounds can be used as solvent. Preferably, the one or more non-ether compounds forming the mixture with one or more ether compounds are selected from solvents which are less polar than the ether compounds used, particular preferably from aliphatic or aromatic hydrocarbons. In a further preferred embodiment of the process according to the invention, the ether compounds used as solvents are selected from the group of linear, cyclic or complexing ether compounds. Herein, a linear ether compound is a compound containing an ether group $R^2$—O—$R^3$ as defined above, in which there is no connection between the $R^2$ and $R^3$ group except the oxygen atom of the ether group, as for example in the symmetrical ethers $Et_2O$, n-$Bu_2O$, $Ph_2O$ or diisoamyl ether (i-$Pentyl_2O$), in which $R^2=R^3$, or in unsymmetrical ethers as t-BuOMe (methyl t-butyl ether, MTBE) or PhOMe (methyl phenyl ether, anisol). A cyclic ether compound used as solvent is a compound in which one or more ether groups are included in a ring formed by a series of atoms, such as for instance tetrahydrofurane, tetrahydropyrane or 1,4-dioxane, which can be substituted e.g. by alkyl groups. In linear ether compounds, also more than one ether group may be included forming a di-, tri-, oligo- or polyether compound, wherein $R^2$ and $R^3$ constitute organyl groups when they are terminal groups of the compounds, and alkylene or arylene groups when they are internal groups. Herein, a terminal group is defined as any group being linked to one oxygen atom which is part of an ether group, while an internal group is defined as any group linked to two oxygen atoms being a constituent of ether groups. Preferred examples of such compounds are dimethoxy ethane, glycol diethers (glymes), in particular diglyme or tetraglyme, without being limited thereto. In the sense of present invention, the term "complex ether" is understood as an ether compound as defined above which is capable of complexing cations, preferably metal cations, more preferably alkali and alkaline metal cations, even more preferably alkaline metal cations, and most preferably lithium cations. Preferred examples of such complex ethers according to the invention are glycol diethers (glymes), in particular diglyme, triglyme, tetraglyme or pentaglyme, or crown ethers, in particular 12-crown-4, 15-crown-5, 18-crown-6, dibenzo-18-crown-6, and diaza-18-crown-6 without being limited thereto. The ether solvent is preferably selected from the group consisting of linear ethers, such as diethyl ether, di-n-butyl ether, complexing ethers, such as dimethoxy ethane, diethylene glycol dimethyl ether (diglyme) or tetraethylene glycoldimethyl ether (tetraglyme), alkylated polyethylene glycols (alkylated PEGs), cyclic ethers such as dioxane, preferably 1,4-dioxane, 2-methyltetrahydrofurane, tetrahydrofurane, or tetrahydropyrane. In a particularly preferred embodiment of the process according to the invention, the ether compound is a high-boiling ether compound, preferably diglyme or tetraglyme. According to the present invention, the term "high-boiling ether compound" is defined as an ether compound according to above definition with a boiling point at 1.01325 bar (standard atmosphere pressure) of preferably at least about 70° C., more preferably at least about 85° C., even more preferably at least about 100° C., and most preferably at least about 120° C. High-boiling ethers can facilitate separation of the desired products from the reaction mixture containing the solvent and residual starting materials. The products in general have lower boiling points than the starting materials, and the boiling points of these products are also lower than the boiling point of high-boiling ethers of above definition. For instance, the respective boiling point (at standard atmosphere pressure) of $HSiCl_3$ is 32° C., while a representative higher-boiling ether compound diglyme has a boiling point of about 162° C. Application of higher-boiling ether compounds as solvents allows higher reaction temperatures to be utilized and simplifies separation of the desired products from the reaction mixture by distillation.

The process for the preparation of trichlorosilane according to the present invention is preferably carried out at a temperature in the range of about −40° C. to about 250° C., more preferably in the range of about 0° C. to about 200° C., still more preferably in the range of about 25° C. to about 150° C.

The process for the preparation of trichlorosilane according to the present invention is preferably carried out at a pressure from about 0.1 to about 10 bar, preferably the reaction is carried out at about normal pressure (about 1013 mbar).

The process of the present invention is preferably carried out under inert conditions. In accordance with the present invention, the term "inert conditions" means that the process is partially or completely carried out under the exclusion of surrounding air, in particular of moisture and oxygen. In order to exclude ambient air from the reaction mixture and the reaction products, closed reaction vessels, reduced pressure and/or inert gases, in particular nitrogen or argon, or combinations of such means may be used.

The process of the present invention can be carried out continuously or discontinuously, such as batchwise.

In a preferred embodiment of the process according to the invention, the resulting trichlorosilane and the chlorosilanes formed from the hydridosilanes are separated from the reaction mixture by distillation. The term "distillation" in the sense of the present invention relates to any process for separating components or substances from a liquid mixture by selective evaporation and condensation. Therein, distillation may result in practically complete separation, leading to the isolation of nearly pure components, or it may be a partial separation that increases the concentration of selected components of the mixture. The distillation processes, which may constitute separation step B), can be simple distillation, fractional distillation, vacuum distillation, short path distillation or any other kind of distillation known to the skilled person. The step of separating the trichlorosilane and the chlorosilanes formed from the hydridosilanes can comprise one or more batch distillation steps, or can comprise a continuous distillation process.

A particular preferred process of the present invention comprises further the steps of hydrogenating of the resulting chlorosilanes to hydridosilanes of the formulae (1) or (2), and recycling said hydridosilanes into the reaction with tetrachlorosilane.

For example in the particular process for the preparation of trichlorosilane, which comprises the reaction of tetrachlorosilane with dimethylsilane preferably according to the reaction equations (I) or (II):

$$Me_2SiH_2 + 2\ SiCl_4 \rightarrow 2\ HSiCl_3 + Me_2SiCl_2 \qquad (I),$$

$$Me_2SiH_2 + SiCl_4 \rightarrow HSiCl_3 + Me_2SiHCl \qquad (II).$$

the resulting $Me_2SiCl_2$ or $Me_2SiHCl$ are separated and at least a part thereof or all thereof are hydrogenated to $Me_2SiH_2$ which is used again in the reaction with tetrachlorosilane.

Preferably the step of hydrogenating the chlorosilanes is carried out with a hydrogenation agent selected from the group consisting of metal hydrides, preferably selected from the group of alkali metal hydrides, such as LiH, NaH, KH, alkaline earth metal hydrides, such as calcium hydride, or complex metal hydrides, such as $LiAlH_4$, $NaBH_4$, n-$Bu_3SnH$, (i-$Bu_2AlH)_2$ or sodium bis(2-methoxyethoxy) aluminum hydride, more preferably the hydrogenation agent is selected from $LiAlH_4$, LiH, $CaH_2$ or LiH which is formed in situ by admixture of LiCl and NaH and subsequent heating said mixture to a temperature in the range of about 60° C. to about 200° C.

Suitable hydrogenation agents generally include metal hydrides, therein preferably selected from binary metal hydrides, such as LiH, NaH, KH, $CaH_2$ or $MgH_2$, complex metal hydrides, such as $LiAlH_4$ or $NaBH_4$, and organometallic hydride reagents, such as n-$Bu_3SnH$, i-$Bu_2AlH$ or sodium bis(2-methoxyethoxy) aluminum hydride, or a hydrogenation agent selected from boron-containing hydride donors, more preferably selected from organohydridoboranes, hydridoboranates, hydridoboronates and hydridoborates, even more preferably hydridoboranates, hydridoboronates and hydridoborates generated from the corresponding boranates, boronates and borates being the Lewis acid part of a frustrated Lewis acid/Lewis base pair and $H_2$. The use of tin hydrides is generally less preferred.

The most preferred hydrogenation agent is lithium hydride.

In a preferred embodiment of the process according to the invention, the amount of the hydrogenation agents, in particular of the metal hydride, preferably LiH in the hydrogenation reaction in relation to the chlorosilane compounds is in the range of about 1 mol-% to about 600 mol-%, preferably about 1 to about 400 mol-%, more preferably about 1 to about 200 mol-%, most preferably about 25 to about 150 mol-%, based on the total molar amount of the chlorine atoms present in chlorosilane compounds.

As described above the most preferred hydrogenation source is LiH, which is converted into lithium chloride (LiCl) in this reaction. In a particular preferred embodiment of such process using lithium hydride the LiCl formed is separated and subjected to the steps of purification, optionally mixing with KCl to prepare the LiCl—KCl eutectic composition, electrolysis of the eutectic or molten LiCl to obtain metallic Li and regeneration of LiH from the Li so prepared. It is the particular advantage of this embodiment that it renders the process of the present invention economical and efficient including in particular in the conversion reaction (Di→M2H), by recycling and valorizing the accruing LiCl and converting it back into LiH.

Therefore, the costs of the Li-metal appearing in both components (LiH and LiCl) is eliminated from the overall cost consideration and only the conversion costs involved in converting LiCl back into LiH is to be considered. In addition, the recycling is going along with the incumbent manufacturing route for LiH. In fact, the hydride material is made from LiCl in two sequential steps: a) electrolysis of the LiCl in the form of an eutectic system (with, e.g. KCl, Downs-Cell/Process) resulting in Li-metal; followed by step b) the hydrogenation of the Li-metal at elevated temperatures with hydrogen gas ($H_2$), which results into LiH (schematically):

(Complete stoichiometry:
2 LiCl→2 Li+$Cl_2$
2 Li+$H_2$→2 LiH).

The hydrogenation reaction is preferably carried out in the presence of one or more solvents, preferably selected from ether solvents such as those described above.

Accordingly, a particularly preferred embodiment of the present invention relates to a process for the preparation of trichlorosilane, which comprises A) the reaction of tetrachlorosilane with dimethylsilane according to the reaction equation (I) or (II):

$Me_2SiH_2$+2 $SiCl_4$→2 $HSiCl_3$+$Me_2SiCl_2$ (I)

$Me_2SiH_2$+$SiCl_4$'$HSiCl_3$+$Me_2SiHCl$ (II), in the presence of a catalyst of the formula $R^1_4QZ$, wherein $R^1$ is an organyl group, more preferably an aliphatic hydrocarbon group, even more preferably a n-alkyl group, and most preferably a n-butyl group, Q is phosphorus or nitrogen, and Z is chlorine, B) separating the $HSiCl_3$ and $Me_2SiCl_2$ or $Me_2SiHCl$ from the reaction mixture, C) hydrogenating the $Me_2SiCl_2$ or $Me_2SiHCl$ or part thereof with a hydrogenating agent which is selected from metal hydrides, preferably LiH, to form $Me_2SiH_2$, and D) recycling the $Me_2SiH_2$, into step A).

The process of the present invention allows the preparation of trichlorosilane with high selectivity. In particular, the selectivity of the formation of $HSiCl_3$ defined as Molar amount of $HSiCl_3$ formed/molar amounts of
all hydrogenated silanes formed ($\Sigma H_{1-4}SiCl_{0-3}$,
wherein the sum of number of hydrogen atoms
and chlorine atoms adds up to 4)×100 is preferably at least 90%, preferably at least 95% and still more preferably at least 99%. That is, in accordance with the process of the present invention tetrachlorosilane is selectively reacted to trichlorosilane without the formation of higher hydrides such as $H_2SiCl_2$, $H_3SiCl$ and $H_4Si$.

Also the conversion rates in the process of the present invention are preferably at least 90%, preferably at least 95% and still more preferably at least 99%. The term conversion rate in the present invention means that if for example $Me_2SiH_2$ is reacted and all hydrogen atoms are used to form $HSiCl_3$, the conversion rate is 100%. When also other monosilanes are formed (e.g., $Me_2SiHCl$), the conversion rate is accordingly reduced. The following examples are to illustrate:

Example 1) $Me_2SiH_2$+2 $SiCl_4$→$Me_2SiCl_2$+2 $HSiCl_3$ correspond to 100% conversion.

Example 2) 10 $Me_2SiH_2$+20 $SiCl_4$→5 $Me_2SiCl_2$+15 $HSiCl_3$+5 $Me_2SiHCl$+5 $SiCl_4$ (remaining)→75% conversion rate (because 75% of all hydrogen atoms were used to form $HSiCl_3$, and 25% used for the formation of $Me_2SiHCl$).

Example 3) 10 $Me_2SiH_2$+20 $SiCl_4$→10 $Me_2SiHCl$+10 $HSiCl_3$+10 $SiCl_4$ (remaining)→50% conversion rate since only half of all hydrogen atoms used were used to form $HSiCl_3$. Accordingly, for a 100% conversion rate, the hydridosilane used must be completely chlorinated to form $HSiCl_3$ and must not retain any of its hydrogen atoms. Accordingly, the conversion rate is defined by the formulas (number of hydrogen atoms of the $HSiCl_3$ formed)/(total number of hydrogen atoms used of the hydridosilane used) or (number of hydrogen atoms of the hydridosilane used, which led to the formation of $HSiCl_3$)/(total number of hydrogen atoms of the hydridosilane used), or otherwise (for monosilanes $R_{4-n}SiH_n$) (molar amount of $HSiCl_3$ formed)/(molar amount of $R_{4-n}SiH_n$ used)*n] (for disilanes one would have to adapt the formula accordingly). While usually conversion rates of 100% are desirable it is possible to operate at lower conversion rates to form e.g. $Me_2SiHCl$ which can be used in the formation of functionalized polysiloxanes.

In the process for the preparation of trichlorosilane according to the invention preferably the molar ratios of the hydridosilanes to tetrachlorosilane ($SiCl_4$) are in the range of about 0.05 to about 2, preferably in the range of about 0.08 to about 1.5, even more preferably in the range of about 0.09 to about 1, most preferably about 0.1 to about 0.9.

In a preferred embodiment of the present invention in the process for the preparation of trichlorosilane the hydridosilanes are formed in situ from chlorosilanes and LiH. In a preferred embodiment of this in situ process $SiCl_4$ is reacted with LiH. It is assumed that in such process $SiH_4$ (in situ formed) reduces excess $SiCl_4$ to give $HSiCl_3$ selectively, whereas the monosilane formation from $SiCl_4$ and LiH (described by W. Sundermeyer, DE1080077, 1957; W. Sundermeyer, L. M. Litz, Chem. Ing. Tech 1965, 37, 14-18; H.

J. Klockner, M. Eschwey, Chem. Ing. Tech. 1988, 60, 815-821) gives the perhydrogenated silane lacking any selectivity.

It will be understood that any numerical range recited herein includes all sub-ranges within that range and any combination of the various endpoints of such ranges or sub-ranges, be it described in the examples or anywhere else in the specification.

It will be also understood that each number recited herein may be subject to a certain inaccuracy, so that each number should be associated with "about".

It will also be understood herein that any of the components of the invention herein as they are described by any specific genus or species detailed in the examples section of the specification, can be used in one embodiment to define an alternative respective definition of any endpoint of a range elsewhere described in the specification with regard to that component, and can thus, in one non-limiting embodiment, be used to supplant such a range endpoint, elsewhere described.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

While the above description contains many specifics, these specifics should not be construed as limitations on the scope of the invention, but merely as exemplifications of preferred embodiments thereof. Those skilled in the art may envision many other possible variations that are within the scope and spirit of the invention as defined by the claims appended hereto.

EXAMPLES

Figure 1:
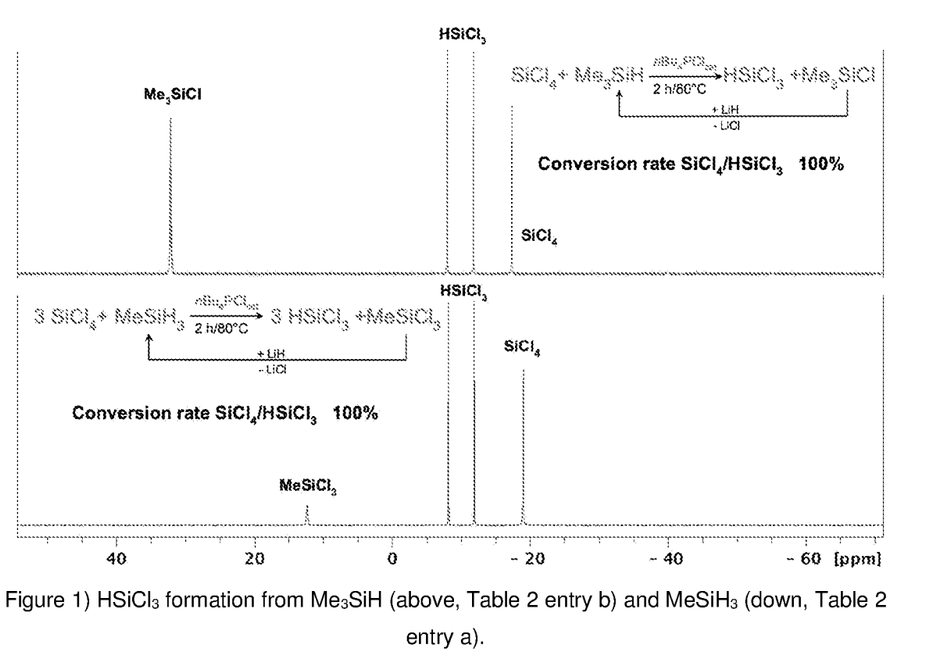
FIG. 1 is a graph showing NMR spectroscopic data for the formation of $HSiCl_3$ from $Me_3SiH$ and $MeSiH_3$, corresponding to Table 2, entries (b) and (a), respectively.
Figure 2:
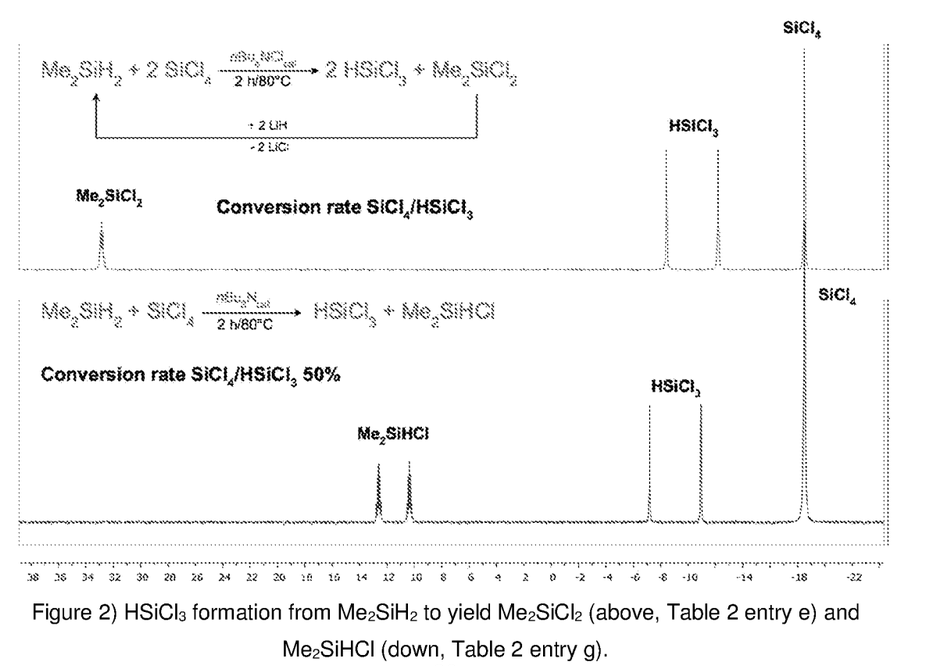
FIG. 2 is a graph showing NMR spectroscopic data for the formation of $HSiCl_3$ from $Me_2SiH_2$ to yield $Me_2SiCl_2$ and $Me_2SiHCl$, corresponding to Table 2 entries (e) and (g), respectively.

The present invention is further illustrated by the following examples, without being limited thereto.

General

To obtain the organohydridosilanes as starting materials, the chlorosilanes, in particular, the organochlorosilanes $R_3SiCl$, $R_2SiCl_2$ and $RSiCl_3$ (R=alkyl, aryl, alkenyl) were converted in particular into their corresponding organomono-, di- and trihydridosilanes $R_3SiH$, $R_2SiH_2$ and $RSiH_3$ by hydrogenation (reduction) with conventional reduction agents, such as metal hydrides MH or $MH_2$, (M=alkali metal, earth alkali metal), or complex metal hydrides (Li-$AlH_4$, $NaBH_4$, i-$Bu_2AlH$, etc.) or mixtures thereof in ethers as solvents (e.g. diethyl ether, di-n-butyl ether, diglyme, 1,4-dioxane or mixtures thereof). Because of safety and economic issues, the use of sodium hydride is preferred and attractive, but it reduces chlorosilanes only under drastic conditions, such as high temperatures that are around 250° C. [A. R. Gilbert, G. D. Cooper, R. W. Shade, Industrial and Engineering Chemistry 51, 5, 665-668, 1959]. On the other hand, lithium hydride (in diglyme as solvent) reduces chlorosilanes under moderate conditions in high yields [A. N. Kornev, V. V. Semenov, Organomet. Chem. in the USSR 4 (4), 420-422, 1991]. Considering the technically facile recycling of LiH from LiCl in KCl/LiCl melt, the use of lithium hydride is strongly favored for chlorosilane reductions.

Tetrachlorosilane, used as reaction partner for organosilanes to obtain trichlorosilane and organochlorosilanes, is the main byproduct of the Siemens Process including the trichlorosilane production from silicon metal and HCl, and is excessively available on the market. The reactions were performed mixing the reaction partners, i.e. the hydridosilanes (0.1 ml) and $SiCl_4$ in about 20-50 mol % excess required for the stoichiometric amount, dissolved in diglyme (0.2-0.3 ml) and the hydrogenation catalyst (1-3 w %) in an NMR tube. After cooling the sample with liquid nitrogen (about −196° C.), the tube was evacuated under vacuum (about 0.1 mbar), and sealed to avoid any losses of low boiling monosilanes such as $Me_2SiHCl$ (b.p. 35° C.), $MeSiHCl_2$ (b.p. 41° C.), $Me_2SiH_2$ (b.p. −20° C.), $MeSiH_3$ (b.p. −58° C.), $HSiCl_3$ (b.p. 32° C.), $H_2SiCl_2$ (b.p. 8° C.), $H_3SiCl$ (b.p. −30° C.) and $SiH_4$ (b.p. −112° C.). The boiling point of $SiCl_4$ is 57° C. The boiling point of $Me_2SiCl_2$ is 70° C. (all b.p. at normal pressure). NMR spectra were recorded depending on reaction time and temperature. For comparison of the catalyst activities each sample was first analyzed NMR-spectroscopically ($^{29}$Si— and $^1$H NMR), either at r.t. after 8 hours or after 2 hours at 80° C. as reaction conditions. In case reduction of $SiCl_4$ was not completed further heating of the sample was accomplished (the experimental conditions for each experiment are depicted in Table 2). The molar ratios of products formed were determined by integration of relevant NMR signals that were assigned to specific products within the mixture; in case the organosilanes $R_3SiH$, $R_2SiH_2$ or $RSiH_3$ were completely consumed (quantitatively chlorinated), the conversion rate $SiCl_4 \rightarrow HSiCl_3$ is defined as 100%; if compounds $R_2SiHCl$ are formed the maximum conversion rate is 50% accordingly.

After optimization and completion of the hydrogenation reaction $SiCl_4 + SiH \rightarrow HSiCl_3 + SiCl$ the NMR tube was opened to analyze the product mixture by GC-MS. Product identification was verified in all cases for the main products.

The amount of products formed can be estimated by the molar ratios as measured by NMR spectroscopy and the amount of starting material applied.

The optimum reaction conditions were evaluated from the NMR experiments and transferred onto the syntheses of $HSiCl_3$ from tetrachlorosilane with the organosilanes $Me_2SiH_2$, $Me_3SiH$ and $PhSiH_3$ as hydrogen transfer reagents in preparative scale exemplarily. Even in preparative scale, the tetrachlorosilane reductions were performed in sealed glass ampoules at elevated temperature (80° C.) to avoid evaporation of compounds. NMR experiments as well as those in closed glass ampoules were run in high boiling solvents, such as diglyme, to reduce the overall pressure at elevated temperatures. Polar ethereal solvents are not required, nonpolar solvents (benzene) did not influence the course of reactions; tetrachlorosilane reductions to give $HSiCl_3$ also work in the absence of any solvent.

The glass ampoules had a length of 150 mm, outer diameter of 50 mm and a wall thickness of 2 mm (internal volume ~200 ml). For high boiling organosilanes, such as $PhSiH_3$, reactions can be performed in open systems. This is exemplarily shown in the following section.

Identification of Compounds

Products were analyzed by $^1$H and $^{29}$Si NMR spectroscopy. The spectra were recorded on a Bruker AV-500 spectrometer equipped with a Prodigy BBO 500 S1 probe. $^1$H NMR spectra were calibrated to the residual solvent proton resonance ([D$_6$]benzene δH=7.16 ppm). Product identification was additionally supported by GC-MS analyses and verified identification of the main products. GC-MS analyses were measured with a Thermo Scientific Trace GC Ultra coupled with an ITQ 900MS mass spectrometer. The stationary phase (Machery-Nagel PERMABOND Silane) had a length of 50 m with an inner diameter of 0.32 mm. 1 μl of analyte solution was injected, 1/25 thereof was transferred onto the column with a flow rate of 1.7 ml/min carried by Helium gas. The temperature of the column was first kept at 50° C. for 10 minutes. Temperature was then elevated at a rate of 20° C./min up to 250° C. and held at that temperature for another 40 minutes. After exiting the column, substances were ionized with 70 eV and cationic fragments were measured within a range of 34-600 m/z (mass per charge). Product mixtures were diluted with benzene prior to the measurement.

$^{29}$Si NMR chemical shifts and coupling constants $^1$J{$^{29}$Si—$^1$H} and $^2$J{$^{29}$Si—$^1$H} for the starting materials and reaction products formed are listed in Table 1. The spectroscopic and analytical data of starting hydridosilanes and products formed are consistent with published values. The monohydrogenations of tetrachlorosilane performed in sealed NMR tubes, the hydrogenation catalysts used, the SiCl$_4$→HSiCl$_3$ conversion rates and the molar product distributions are listed in Table 2.

TABLE 1

$^{29}$Si NMR spectroscopic data of mono- and disilanes.

| Hydridosilane | δ $^{29}$Si [ppm] | $^1$J$_{Si-H}$ [Hz] | $^2$J$_{Si-H}$ [Hz] |
|---|---|---|---|
| MeSiH$_3$ | −65.5 | 194.1 | 8.0 |
| Me$_2$SiH$_2$ | −38.1 | 187.6 | 7.5 |
| Me$_3$SiH | −16.6 | 182.9 | 7.0 |
| Et$_2$SiH$_2$ | −23.1 | 183.8 | 7.6 |
| iPr$_2$SiH$_2$ | −8.3 | 181.6 | 6.8 |
| PhSiH$_3$ | −60.2 | 200.0 | 6.4 |
| Ph$_2$SiH$_2$ | −33.9 | 198.2 | 6.0 |
| PhMeSiH$_2$ | −36.1 | 193.1 | 6.9 |
| ViSiH$_3$ | −64.5 | 198.6 | — |
| ViMeSiH$_2$ | −40.5 | 192.7 | — |
| tBu$_2$SiH$_2$ | 1.6 | 181.6 | 6.2 |
| Hex$_2$SiH$_2$ | −28.8 | 183.6 | — |
| Me$_2$Si(OEt)H | 2.9 | 199.6 | 3.5 |
| MeSiHCl$_2$ | 10.9 | 280.1 | 7.8 |
| Me$_2$SiHCl | 11.0 | 223.1 | 7.2 |
| Et$_2$SiHCl | 18.5 | 216.9 | 8.0 |
| iPr$_2$SiHCl | 24.1 | 212.9 | 7.3 |
| MeSiCl$_3$ | 12.8 | — | 8.6 |
| Me$_2$SiCl$_2$ | 32.5 | — | 7.6 |
| Me$_3$SiCl | 31.1 | — | 7.0 |
| Et$_2$SiCl$_2$ | 36.4 | — | — |
| iPr$_2$SiCl$_2$ | 38.2 | — | — |
| PhSiCl$_3$ | −0.4 | — | — |
| Ph$_2$SiCl$_2$ | 6.3 | — | — |
| PhMeSiCl$_2$ | 19.3 | — | 7.3 |
| ViSiCl$_3$ | −3.1 | — | — |
| ViMeSiCl$_2$ | 16.8 | — | — |
| SiCl$_4$ | −18.5 | — | — |
| HSiCl$_3$ | −9.1 | 372.6 | — |
| H$_2$SiCl$_2$ | −11.4 | 292.1 | — |
| H$_3$SiCl | −37.6 | 240.3 | — |
| SiH$_4$ | −96.2 | 202.9 | — |
| EtOSiCl$_3$ | −38.9 | — | — |
| (EtO)$_2$SiCl$_2$ | −56.3 | — | — |
| (EtO)$_3$SiCl | −70.3 | — | — |
| MeH$_2$Si—SiH$_2$Me | −67.8 | 185.8 | 3.6 |
| Me$_2$HSi—SiHMe$_2$ | −39.5 | 177.5 | 3.3 |
| Me$_2$HSi$^A$—Si$^B$H$_2$Me | −39.9/−66.7 | 180.9/180.5 | — |
| Me$_3$Si$^A$—Si$^B$HMe$_2$ | −19.2/−39.4 | —/172.5 | — |
| Me$_3$Si$^A$—Si$^B$H$_2$Me | −18.3/−66.0 | — | — |
| MeCl$_2$Si—SiCl$_2$Me | 17.6 | — | — |
| Me$_2$ClSi—SiClMe$_2$ | 17.2 | — | — |

TABLE 2

Selective conversion of SiCl$_4$ to HSiCl$_3$ with organohydridomonosilanes*[)].

| entry | Hydrido-silane | catalyst (1-3 w %) | conv. rate[1)] | t/T (h/° C.) | product distribution (mol %) | Hydridosilane (ml/mmol) | SiCl$_4$ (ml/mmol) |
|---|---|---|---|---|---|---|---|
| a | MeSiH$_3$ | n-Bu$_4$PCl | 100 | 2/80 | HSiCl$_3$ (55), MeSiCl$_3$ (17), SiCl$_4$ (28) | MeSiH$_3$ (0.04/0.54) | 0.31/2.66 |
| b | Me$_3$SiH | n-Bu$_4$PCl | 100 | 2/80 | HSiCl$_3$ (44), Me$_3$SiCl (45), SiCl$_4$ (11) | Me$_3$SiH (0.10/0.86) | 0.12/1.05 |
| c | Me$_2$SiH$_2$ | n-Bu$_4$PCl | 100 | 2/80 | HSiCl$_3$ (55), Me$_2$SiCl$_2$ (27), SiCl$_4$ (18) | Me$_2$SiH$_2$ (0.10/1.13) | 0.35/3.06 |
| d | Me$_2$SiH$_2$ | n-Bu$_4$PCl | 78 | 8/r.t. | HSiCl$_3$ (31), Me$_2$SiCl$_2$ (9), Me$_2$SiHCl (11), SiCl$_4$ (49) | Me$_2$SiH$_2$ (0.05/0.57) | 0.23/2.02 |
|  |  |  | 100 | +2/80 | HSiCl$_3$ (40), Me$_2$SiCl$_2$ (19), SiCl$_4$ (41) |  |  |
| e | Me$_2$SiH$_2$ | n-Bu$_4$NCl | 66 | 8/r.t. | HSiCl$_3$ (30), Me$_2$SiCl$_2$ (7), Me$_2$SiHCl (15), SiCl$_4$ (48) | Me$_2$SiH$_2$ (0.05/0.57) | 0.23/2.02 |
|  |  |  | 100 | +2/80 | HSiCl$_3$ (42), Me$_2$SiCl$_2$ (20), SiCl$_4$ (38) |  |  |
| f | Me$_2$SiH$_2$ | n-Bu$_3$P | 52 | 8/r.t. | HSiCl$_3$ (19), Me$_2$SiCl$_2$ (1), Me$_2$SiHCl (21), SiCl$_4$ (59) | Me$_2$SiH$_2$ (0.05/0.57) | 0.23/2.02 |
|  |  |  | 100 | +2/80 | HSiCl$_3$ (32), Me$_2$SiCl$_2$ (13), Me$_2$SiHCl (8), SiCl$_4$ (47) |  |  |
| g | Me$_2$SiH$_2$ | n-Bu$_3$N | 41 | 8/r.t. | HSiCl$_3$ (16), Me$_2$SiHCl (18), SiCl$_4$ (62), Me$_2$SiH$_2$ (4) | Me$_2$SiH$_2$ (0.05/0.57) | 0.23/2.02 |
|  |  |  | 50 | +2/80 | HSiCl$_3$ (25), Me$_2$SiHCl (25), SiCl$_4$ (50) |  |  |
| h | Et$_2$SiH$_2$ | n-Bu$_4$PCl | 97 | 2/80 | HSiCl$_3$ (50), Et$_2$SiCl$_2$ (24), Et$_2$SiHCl (1), SiCl$_4$ (30) | Et$_2$SiH$_2$ (0.08/0.62) | 0.21/1.86 |
|  |  |  | 100 | +24/80 | HSiCl$_3$ (51), Et$_2$SiCl$_2$ (25), SiCl$_4$ (24) |  |  |
| i | Et$_2$SiH$_2$ | n-Bu$_4$NCl | 96 | 2/80 | HSiCl$_3$ (52), Et$_2$SiCl$_2$ (24), Et$_2$SiHCl (2), SiCl$_4$ (27) | Et$_2$SiH$_2$ (0.08/0.62) | 0.21/1.86 |
|  |  |  | 100 | +24/80 | HSiCl$_3$ (55), Et$_2$SiCl$_2$ (26), SiCl$_4$ (19) |  |  |
| k | Et$_2$SiH$_2$ | n-Bu$_3$P | 56 | 2/80 | HSiCl$_3$ (31), Et$_2$SiCl$_2$ (3), Et$_2$SiHCl (22), SiCl$_4$ (45) | Et$_2$SiH$_2$ (0.08/0.62) | 0.21/1.86 |
|  |  |  | 100 | +24/80 | HSiCl$_3$ (54), Et$_2$SiCl$_2$ (24), SiCl$_4$ (22) |  |  |
| l | Et$_2$SiH$_2$ | n-Bu$_3$N | 45 | 2/80 | HSiCl$_3$ (25), Et$_2$SiCl$_2$ (24), Et$_2$SiHCl (49), Et$_2$SiH$_2$ (2) | Et$_2$SiH$_2$ (0.08/0.62) | 0.21/1.86 |
|  |  |  | 54 | +24/80 | HSiCl$_3$ (30), Et$_2$SiCl$_2$ (2), Et$_2$SiHCl (24), SiCl$_4$ (44) |  |  |
| m | MeSiHCl$_2$ | n-Bu$_4$PCl | 100 | 2/80 | HSiCl$_3$ (46), MeSiCl$_3$ (43), SiCl$_4$ (11) | MeSiHCl$_2$ (0.10/0.97) | 0.15/1.30 |
| n | Me$_2$SiHCl | n-Bu$_4$PCl | 100 | 2/80 | HSiCl$_3$ (45), Me$_2$SiCl$_2$ (45), SiCl$_4$ (10) | Me$_2$SiHCl (0.10/0.9) | 0.13/1.13 |
| o | PhSiH$_3$ | n-Bu$_4$PCl | 100 | 2/80 | HSiCl$_3$ (60), PhSiCl$_3$ (19), SiCl$_4$ (21) | PhSiH$_3$ (0.05/0.41) | 0.20/1.73 |
| p | Ph$_2$SiH$_2$ | n-Bu$_4$PCl | 100 | 2/80 | HSiCl$_3$ (57), Ph$_2$SiCl$_2$ (26), SiCl$_4$ (17) | Ph$_2$SiH$_2$ (0.10/0.54) | 0.18/1.54 |
| q | PhMeSiH$_2$ | n-Bu$_4$PCl | 100 | 2/80 | HSiCl$_3$ (58), PhMeSiCl$_2$ (27), SiCl$_4$ (15) | PhMeSiH$_2$ (0.07/0.53) | 0.17/1.43 |

TABLE 2-continued

Selective conversion of $SiCl_4$ to $HSiCl_3$ with organohydridomonosilanes[*].

| entry | Hydrido-silane | catalyst (1-3 w %) | conv. rate[1] | t/T (h/° C.) | product distribution (mol %) | Hydridosilane (ml/mmol) | $SiCl_4$ (ml/mmol) |
|---|---|---|---|---|---|---|---|
| r | $iPr_2SiH_2$ | n-$Bu_4$PCl | 56 | 2/80 | $HSiCl_3$ (34), $iPr_2SiCl_2$ (3), $iPr_2SiHCl$ (22), $SiCl_4$ (41) | $iPr_2SiH_2$ (0.10/0.63) | 0.22/1.89 |
|   |   | n-$Bu_4$PCl | 100 | +30/80 | $HSiCl_3$ (50), $iPr_2SiCl_2$ (24), $SiCl_4$ (26) |   |   |
| s[2] | $Hex_2SiH_2$ | n-$Bu_4$PCl | none | 30/80 | no reaction | $Hex_2SiH_2$ (0.13/0.58) | 2.00/1.74 |
| t[3] | $tBu_2SiH_2$ | n-$Bu_4$PCl | 50 | 12/120 | $HSiCl_3$ (24), $tBu_2SiHCl$ (26), $SiCl_4$ (50) | $tBu_2SiH_2$ (0.10/0.51) | 0.17/1.46 |
| u[4] | $Me_2Si(OEt)H$ | n-$Bu_4$PCl | 20 | 2/80 | $HSiCl_3$ (21), $Me_2SiCl_2$ (51), $SiCl_4$ (1), $EtOSiCl_3$ (8), $(EtO)_2SiCl_2$ (7), $(EtO)_3SiCl$ (1), X (11) | $Me_2Si(OEt)H$ (0.10/0.73) | 0.11/0.95 |
| v | $ViSiH_3$ | n-$Bu_4$PCl | 100 | 2/80 | $HSiCl_3$ (60), $ViSiCl_3$ (18), $SiCl_4$ (22) | $ViSiH_3$ (0.05/0.57) | 0.30/2.61 |
| w | $ViMeSiH_2$ | n-$Bu_4$PCl | 100 | 2/80 | $HSiCl_3$ (60), $ViMeSiCl_2$ (29), $SiCl_4$ (21) | $ViMeSiH_2$ (0.10/0.94) | 0.26/2.30 |
| x | $Et_2SiH_2$ | n-$Bu_4$PCl | 93 | 2/80 | $HSiCl_3$ (62), $Et_2SiCl_2$ (26), $Et_2SiHCl$ (4), $SiCl_4$ (8) | $Et_2SiH_2$ (0.10/0.77) | 0.20/1.70 |
|   |   |   | 100 | +2/80 | $HSiCl_3$ (64), $Et_2SiCl_2$ (31), $SiCl_4$ (5) |   |   |

[*]General conditions: excess of $SiCl_4$ in addition to the stoichiometric amount is favored for full conversion: ~20-50 mol %. In case the $SiCl_4 \rightarrow HSiCl_3$ conversion rate was not 100%, the sample was further heated for complete reduction (+ means: in addition to the aforementioned reaction conditions).
[1]The conversion rate $SiCl_4 \rightarrow HSiCl_3$ is based on full chlorination of the starting organohydridosilane upon monohydrogenation of $SiCl_4$. In all cases, $SiCl_4$ is selectively monohydrogenated to give $HSiCl_3$. In cases of organohydridochlorosilane formation (e.g. $R_2SiH_2 + SiCl_4 \rightarrow HSiCl_3 + R_2SiHCl$) the max. conversion rate $SiCl_4 \rightarrow HSiCl_3$ is 50%.
[2]Obviously due to the sterical demand of the hexyl groups, $Hex_2SiH_2$ does not react with $SiCl_4$ under the given conditions.
[3]Obviously due to the sterical demand of the t-butyl groups, $tBu_2SiH_2$ reacts with $SiCl_4$ only at 120° C. to give selectively $tBu_2SiHCl$ ($SiCl_4 \rightarrow HSiCl_3$ conversion rate: 50%)
[4]Excess $SiCl_4$ is nearly completely consumed by side reactions (ethoxychlorosilane formation). $SiCl_4$ remained in the reaction mixture in only 1%. X = not identified compound.

As concluded from Table 2, the degree of monohydrogenation of tetrachlorosilane to selectively yielding trichlorosilane is mainly dominated by two factors: first by the steric demand of the organo-substituents at the silicon center of the monosilanes bearing hydrogen as transfer reagent and then by the hydrogenation activity of the catalysts investigated. Methyl-substituted hydridosilanes $MeSiH_3$, $Me_2SiH_2$ and $Me_3SiH$ (entries a-g) start with the hydrogenation of $SiCl_4$ already at room temperature (~25° C.) as listed for $Me_2SiH_2$ (entries d-g) showing $SiCl_4$/$HSiCl_3$ conversion rates between 40% and 80%, finally reacting quantitatively at 80° C. (100%). The experiments of entries d-g) clearly demonstrate a catalytic hydrogenation activity or potential decreasing in the series n-$Bu_4PCl \approx$ n-$Bu_4NCl >$ n-$Bu_3P >$ n-$Bu_3N$. This experimentally enables a facile reaction control to for example synthesize hydridochlorosilanes ($R_2SiHCl$) apart from trichlorosilane (entries e-g) at room temperature or, alternatively, to produce the fully chlorinated methylsilanes (entries a-c) under moderate conditions (2 h/80° C.). The experiments of series e-g clearly show the hydridosilane chlorination to happen stepwise. Noteworthy, in no experiment a double hydrogenation of $SiCl_4$ to yield dichlorosilane, $H_2SiCl_2$, was detected, the hydrodechlorination of tetrachlorosilane to give trichlorosilane is extraordinary selective. Comparable trends are recorded for diethylsilane, $Et_2SiH_2$ (entries h-l), already showing the increased steric demand of ethyl groups compared to the methyl-substituents: Even after 26 h reaction time at 80° C. reaction temperature $Et_2SiHCl$ is nearly quantitatively formed under n-$Bu_3N$-catalysis (conversion rate $SiCl_4$/$HSiCl_3$ 54%, entry l) while $Me_2SiHCl$ was formed from $Me_2SiH_2$ already after 2 h/80° C. (entry g). As expected, use of n-$Bu_4NCl$ or n-$Bu_4PCl$ as catalyst gave a conversion rate of 100% with full chlorination of the dihydridosilane (entries h and i). Considering the stepwise chlorination of methylsilanes (entries a, c, d) with tetrachlorosilane, it was expected that the methylchlorosilanes $MeSiHCl_2$ and $Me_2SiHCl$ give trichlorosilane and the respective methylchlorosilanes quantitatively under n-$Bu_4PCl$ catalysis—the experimental proof is depicted in the Table 2 (entries m and n). The steric demand of vinyl- and the planar phenyl-substituents at silicon is comparably low, the experiments showed no steric hindrance of the $SiCl_4$/$HSiCl_3$ transformation: The phenylsilanes (entries o-q) and vinylsilanes (entries v and w) were fully chlorinated by $SiCl_4$ to give conversion rates $SiCl_4$/$HSiCl_3$ of 100%. The increasing steric demand of isopropyl groups at silicon was convincingly demonstrated for $iPr_2SiH_2$ that gave a $SiCl_4$/$HSiCl_3$ conversion rate of 56% (2 h/80° C.) mainly giving $iPr_2SiHCl$ as counterpart. Prolonged reaction time of 32 h yielded the $Pr_2SiCl_2$ quantitatively (entry r). The same counts for $tBu_2SiH_2$ that started to react only at 120° C. to give $tBu_2SiHCl$ after 12 h quantitatively ($SiCl_4$/$HSiCl_3$ conversion rate 50%, entry t). Even more, $Hex_2SiH_2$ did not show any hydrogenation activity at all (entry s), it completely prevents $SiCl_4$/$HSiCl_3$ conversion. The very sensitive ethoxy-substituent of $Me_2Si(OEt)H$ caused side reactions with excess tetrachlorosilane to give ethoxychlorosilanes $(EtO)_nSiCl_{4-n}$ (n=1-3) as side products, but $SiCl_4$/$HSiCl_3$ conversion was 20% (entry u). The experiment of entry x demonstrates that excess $SiCl_4$ is not required for monohydrogenation to yield $HSiCl_3$ (conversion rates $SiCl_4$/$HSiCl_3$ 97% (entry h) vs 93% but increasing to 100% after 4 h/80° C. The main factor for product formation is determined by the stoichiometry of the reaction partners.

A) Synthesis of $HSiCl_3$ from $Me_2SiH_2$ and $SiCl_4$ in Preparative Scale a) Synthesis of $Me_2SiH_2$ by reduction of $Me_2SiCl_2$ with LiH in THF In a 250 ml three-necked flask equipped with a dropping funnel, reflux condenser and a magnetic stirrer were placed 7.22 g (0.88 mol, 97%) lithium hydride (LiH), suspended in 100 ml of thoroughly dried tetrahydrofurane (THF) under an inert nitrogen atmosphere. The THF/LiH suspension was carefully scaled from oxygen/air by degassing in vacuo and refilling with gaseous nitrogen to establish inert conditions. To the vigorously stirred suspension 56.84 g (53.6 ml, 0.44 mol) of dimethyldichlorosilane ($Me_2SiCl_2$) were slowly added over the dropping funnel. Upon addition, the reduction of $Me_2SiCl_2$ started after an induction period of 5 minutes with self-heating of the solution to about 54° C. Dimethylsilane ($Me_2SiH_2$, b.p.: −20° C.), formed continuously, evaporated and was frozen in a cooling trap (−196° C.) which was connected with the top of the reflux condenser. After $Me_2SiCl_2$ addition was completed (1 h, final temperature 50° C.), the mixture was subsequently heated to reflux (75° C. oil bath temperature) for an additional hour and then cooled down to r.t. To completely collect $Me_2SiH_2$ in the cooling trap, the reaction flask was applied to vacuum and the product was pumped off. $Me_2SiH_2$ inside the cooling trap was separated from THF by low temperature distillation and was isolated in 96% yield (25.4 g, 0.42 mol). Formed LiCl was isolated in 36.05 g (96% conversion of LiH into LiCl; theoretical yield after 100% conversion: 37.56 g) by removal of THF and remaining silanes in vacuo at 160° C., which is in line with the amount of formed $Me_2SiH_2$.

b) Synthesis of $HSiCl_3$

A glass ampoule (length: 15 cm, inner diameter: 5 cm, wall thickness: 2 mm) was evacuated in vacuo and subsequently filled with gaseous nitrogen to create an inert atmosphere. Then, 96.6 g (0.57 mol) $SiCl_4$, 2.15 g (0.007 mol, 2 w %) n-$Bu_4PCl$ and 43 ml (39.63 g) diglyme were filled into the ampoule that was frozen at −196° C. (liquid $N_2$) and evacuated in vacuo. 13.58 g (0.23 mol) $Me_2SiH_2$ were added by low temperature condensation. Subsequently the ampoule was sealed, warmed to r.t. (25° C.) and heated to 80° C. for 5 h. After completion the reaction mixture was frozen (−196° C.) and the ampoule opened under an inert atmosphere. Volatile products were condensed into a flask that was connected to a Vigreux column (50 cm) and a distillery, which was connected to a cooling trap (−196° C.) to possibly collect unreacted $Me_2SiH_2$. The distillation condenser was cooled to 8° C. with a cryostat, the product receiving flask was cooled to −10° C. ($HSiCl_3$ b.p.: 32° C.) to reduce losses of $HSiCl_3$. Careful fractional distillation at normal pressure gave a first fraction containing 37 g of $HSiCl_3$ besides 6 g of $SiCl_4$ and 4 g of $Me_2SiCl_2$. The second fraction consisted of 22 g $HSiCl_3$, 15 g of $SiCl_4$ and 22 g of $Me_2SiCl_2$. 2 g of $Me_2SiCl_2$ remained in the residue. $Me_2SiH_2$ was completely consumed. After a second distillation step $HSiCl_3$ was isolated in an excellent isolated yield: 57 g (0.42 mol), 93% related to the molar amount of $Me_2SiH_2$ reacted.

B) Synthesis of $HSiCl_3$ from $Me_3SiH$ and $SiCl_4$ in Preparative Scale a) Synthesis of $Me_3SiH$ by reduction of $Me_3SiCl$ with LiH in Diglyme As described for the synthesis of $Me_2SiH_2$, 34.00 g (0.31 mol) $Me_3SiCl$ were reacted with 2.50 g LiH (0.31 mol). After completion of the chlorosilane reduction and collection of $Me_3SiH$ together with some diglyme in the cooling trap, trimethylsilane was isolated by low temperature distillation in 97% yield (b.p. 6.7° C., 22.5 g, 0.30 mol). Formed LiCl was isolated in 12.94 g (97% conversion of LiH into LiCl; theoretical yield after 100% conversion: 13.26 g) by removal of diglyme and remaining silanes in vacuo at 160° C., which is in line with the amount of formed $Me_3SiH$.

b) Synthesis of $HSiCl_3$ In analogy to the $HSiCl_3$ synthesis with $Me_2SiH_2$ as hydrogenation agent, 12.34 g (0.17 mol) $Me_3SiH$, $SiCl_4$ (35.1 g, 0.21 mol), 0.5 g n-$Bu_4PCl$ (1.7 mmol, 1.0 w %) and 20 ml diglyme were reacted in a sealed glass ampoule at 80° C. for 14 h. The $^{29}Si$ NMR analysis of the product mixture before work up showed full conversion of tetrachloro-into trichlorosilane (100%) with no remaining $Me_3SiH$. The molar ratio $Me_3SiCl/HSiCl_3/SiCl_4$ was 45/43/12. Careful fractional distillation (50 cm Vigreux column, distillation condenser: 8° C.) gave $HSiCl_3$ in 97% (21.78 g, 0.16 mol) related to the molar amount of $Me_3SiH$ reacted. Boiling points: $HSiCl_3$ 32° C., $Me_3SiCl$ 57° C.

C) Synthesis of $HSiCl_3$ from $PhSiH_3$ and $SiCl_4$ in Preparative Scale, Open System The reaction of $PhSiH_3$ with $SiCl_4$ for the synthesis of $HSiCl_3$ was performed in an open system. In a two necked Schlenk-flask equipped with a reflux condenser (cooling temperature 27° C.) and a dropping funnel were admixed 72.19 g (424.9 mmol) $SiCl_4$, 52 ml diglyme and 0.54 g (1.8 mmol) n-$Bu_4PCl$ under an inert $N_2$ atmosphere. The reaction mixture was heated to reflux (oil bath temperature 80° C.) and 9.50 g (87.8 mmol) of $PhSiH_3$ were slowly added via the dropping funnel. After addition was completed (30 min), the reaction mixture was heated to reflux (oil bath temperature 80° C.) for additional 4 hours. During the heating period $HSiCl_3$ continuously condensed in a cooling trap (−196° C.) that was connected with the reflux condenser. Subsequently, the product mixture was frozen (−196° C.), the reaction system evacuated and upon warming to room temperature all volatiles condensed into the cooling trap. After condensation was completed, all volatiles inside the cooling trap were condensed into a glass ampoule (−196° C., 59.44 g) with attached NMR tube. The glass ampoule was sealed in vacuo, warmed to r.t. and 0.5 ml of the product mixture were poured into the attached NMR tube. The NMR tube was disconnected from the glass ampoule and the condensed reaction products (Table 3) as well as the remaining residue within the reaction flask were investigated by $^1H$ and $^{29}Si$ NMR spectroscopy.

TABLE 3

Condensed product mixture (59.44 g) collected in the glass ampoule.

| compound | mol % | mmol | g |
|---|---|---|---|
| $HSiCl_3$ | 60.3 | 246.1 | 33.34 |
| $H_2SiCl_2$ | 4.0 | 16.2 | 1.64 |
| $SiCl_4$ | 33.6 | 137.0 | 23.28 |
| diglyme | 2.1 | 8.8 | 1.18 |

$PhSiH_3$ was fully perchlorinated to give $PhSiCl_3$ that remained in the reaction flask. The corresponding conversion rate of $SiCl_4 \rightarrow HSiCl_3/H_2SiCl_2$ was 100%; the molar ratio of $HSiCl_3/H_2SiCl_2$ was 94/6.

D) Synthesis of $HSiCl_3$ and $Me_2SiHCl$ in Preparative Scale

In analogy to the $HSiCl_3$ synthesis with $Me_2SiH_2$ as hydrogenation agent in B), 6.62 g (0.11 mol) $Me_2SiH_2$, $SiCl_4$ (38.12 g, 0.22 mol), 0.5 g n-$Bu_3N$ (3.4 mmol, 1.4 w %) and 20 ml diglyme were reacted in a sealed glass ampoule with attached NMR tube at 80° C. for 4 h. After the sample was cooled to r.t., 0.5 ml of the product mixture was poured into the NMR tube, the NMR tube was sealed and products formed were analyzed NMR spectroscopically. The $^{29}Si$ NMR analysis of the product mixture is depicted in Table 4 (yields in mol %).

TABLE 4

Hydrogenation of $SiCl_4$ with $Me_2SiH_2$.

| silane | 4 h/80° C. |
|---|---|
| $Me_2SiH_2$ | 2 |
| $Me_2SiHCl$ | 34 |
| $SiCl_4$ | 34 |
| $HSiCl_3$ | 29 |
| $H_2SiCl_2$ | 1 |

The product mixture was subsequently heated for additional 2 hours at 80° C. to complete conversion of $Me_2SiH_2$ to $Me_2SiHCl$. Then the product mixture was frozen with liquid nitrogen (−196° C.), opened and all volatile compounds were pumped off into a cooling trap (−196° C.). Due to very similar boiling points of the targeted products $HSiCl_3$ and $Me_2SiHCl$ (32° C. vs 35° C.), further separation was not possible with the distillation equipment available and therefore disregarded. The product distribution of the collected volatiles (35.4 g) was investigated by $^1H$ and $^{29}Si$ NMR analyses and is depicted in Table 5. Small amounts of $SiCl_4$ remained in the residue.

TABLE 5

Product distribution of the volatiles collected in the cooling trap.

| silane | mol % | mol | g |
|---|---|---|---|
| Me$_2$SiHCl | 38 | 0.10 | 9.8 |
| SiCl$_4$ | 27 | 0.07 | 13.6 |
| HSiCl$_3$ | 35 | 0.10 | 12.0 |

The conversion rate SiCl$_4$/HSiCl$_3$ is 45%. Related to a quantitative reaction with a conversion rate of 50% the overall yield of product formation is 91%.

E) Synthesis of HSiCl$_3$ from Et$_2$SiH$_2$ and SiCl$_4$ Under LiCl and KCl Catalysis 0.08 ml (0.62 mmol) Et$_2$SiH$_2$, 0.17 ml SiCl$_4$ (1.45 mmol), 0.3 ml diglyme and 0.05 ml C$_6$D$_6$ were admixed together with catalytic amounts of lithium chloride or potassium chloride (0.10 mmol), respectively, in an NMR tube. The NMR tubes were cooled to −196° C., evacuated and sealed. The samples were heated and analyzed by NMR spectroscopy, according to Table 6.

TABLE 6

LiCl and KCl catalyzed reaction of Et$_2$SiH$_2$ and SiCl$_4$.

| | LiCl catalysis | | | KCl catalysis | | |
|---|---|---|---|---|---|---|
| silane | 80° C. 4 h | 120° C. +18 h | 120° C. +36 h | 80° C. 4 h | 120° C. +18 h | 120° C. +36 h |
| Et$_2$SiH$_2$ | 29 | 8 | — | 31 | 31 | 28 |
| Et$_2$SiHCl | 3 | 20 | 28 | — | — | 3 |
| SiCl$_4$ | 65 | 54 | 44 | 69 | 69 | 66 |
| HSiCl$_3$ | 3 | 20 | 28 | — | — | 3 |
| H$_2$SiCl$_2$ | — | <1 | <<1 | — | — | — |

In case of the LiCl catalysis no Et$_2$SiH$_2$ remained after a reaction time of 54 h at 120° C. Et$_2$SiHCl was formed upon Et$_2$SiH$_2$ monochlorination selectively; the conversion rate SiCl$_4$→HSiCl$_3$ was 50% accordingly. Dichlorosilane formed only in traces.

Under comparable conditions HSiCl$_3$ and Et$_2$SiHCl formed only in 3% by replacement of LiCl against KCl, thus characterizing LiCl as the much more powerful hydrogenation catalyst; but the catalyst activity of LiCl is less compared to ammonium- and phosphonium chlorides and phosphines and amines.

F) Synthesis of HSiCl$_3$ from Methylhydridodisilanes and SiCl$_4$

F1) 0.1 ml (0.61 mmol) Me$_2$HSi—SiHMe$_2$, 0.21 ml SiCl$_4$ (1.8 mmol), 0.3 ml diglyme and 0.05 ml C$_6$D$_6$ were admixed with catalytic amounts of phosphonium chloride (0.02 mmol) in an NMR tube. The NMR tube was cooled to −196° C., evacuated and sealed. The sample was heated for 4 hours at 80° C. and analyzed by NMR spectroscopy (Table 7).

TABLE 7

Product distribution of the reaction of tetramethyldisilane with SiCl$_4$.

| silane | mol % |
|---|---|
| HSiCl$_3$ | 52 |
| (Me$_2$ClSi)$_2$ | 24 |
| SiCl$_4$ | 24 |

This example clearly proves tetramethyldisilane as hydrogen shuttle to selectively monodehalogenate tetrachlorosilane to yield pure trichlorosilane (conversion rate SiCl$_4$/HSiCl$_3$: 100%). Organochlorodisilanes R$_n$Si$_2$Cl$_{6-n}$ (n=1-5, R=organo-substituent) generally have much higher boiling points compared to the corresponding monosilanes. Thus, this process will strongly diminish the separation problems organochlorosilane/trichlorosilane by conventional distillation procedures. As the reaction conditions required for tetrachlorosilane monoreduction are comparably smooth, no disilane cleavage (for n=4-5) is performed with the hydrogenation catalyst—recycling of methylchlorodisilanes thus is preparatively facile by conventional reductions (in case of tetramethyldichlorosilane even LiH is suitable for the quantitative formation of the dihydridosubsituted disilane), making this process route very attractive for practical and industrial use.

F2 a) 0.05 ml (0.4 mmol) MeH$_2$Si—SiH$_2$Me, 0.4 ml SiCl$_4$ (3.5 mmol), 0.3 ml diglyme and 0.05 ml C$_6$D$_6$ were admixed with catalytic amounts of phosphonium chloride (0.02 mmol) in an NMR tube. The NMR tube was cooled to −196° C., evacuated and sealed. The sample was left at r.t. for 15 h and analyzed by NMR spectroscopy (Table 8).

TABLE 8

Product distribution of the reaction of dimethyldisilane with SiCl$_4$ at r.t.

| silane | mol %* | mol %** |
|---|---|---|
| HSiCl$_3$ | 37 | 68 |
| SiCl$_4$ | 46 | — |
| MeSiCl$_3$ | 6 | 12 |
| MeSiHCl$_2$ | 7 | 13 |
| MeSiH$_2$Cl | 1 | 2 |
| SiH$_4$ | 1 | 2 |
| Me$_2$Si$_2$Cl$_4$ | 2 | 3 |

*including SiCl$_4$,
**without SiCl$_4$

As concluded from Table 8 that contains the product distribution in mol % including both, excess SiCl$_4$ and without SiCl$_4$, HSiCl$_3$ was formed in 37% (68%) already at r.t. (15 h), while dimethyltetrachlorodisilane was formed in 2 mol %* (3 mol %)**. Thus, disilane cleavage under phosphonium chloride catalysis to yield MeSiCl$_3$ and MeSiHCl$_2$ is detectable already under smooth conditions. While SiH$_4$ is formed in 1 mol %* (2 mol %)**, notably, mono- and dichlorosilane was not formed at all. This proves the dimethyldisilane as hydrogen transfer reagent to reduce SiCl$_4$ with simultaneous disilane cleavage to yield MeSiCl$_3$ and MeSiHCl$_2$. From a comparable control experiment reacting an authentic sample of dimethyldisilane with catalytic amounts of n-Bu$_4$PCl at r.t. to 50° C., methylsilane MeSiH$_3$ (besides some oligosilanes) is formed quantitatively. This compound is not detected in the product mixture, but according to Table 2, entry a), methylsilane quantitatively reduces SiCl$_4$ to give HSiCl$_3$ and MeSiCl$_3$.

F2 b) A comparable sample to F2 b) [0.05 ml (0.4 mmol) MeH$_2$Si—SiH$_2$Me, 0.4 ml SiCl$_4$ (3.5 mmol), 0.3 ml diglyme, 0.05 ml C$_6$D$_6$ and catalytic amounts of phosphonium chloride (0.02 mmol)] was heated for 12 hours at 80° C. and the products formed analyzed by NMR spectroscopy (Table 9). The product distribution is listed in mol %, again, with excess SiCl$_4$ and without SiCl$_4$.

TABLE 9

Product distribution of the reaction of dimethyldisilane with SiCl$_4$ at 80 °C.

| silane | mol %* | mol %** |
|---|---|---|
| HSiCl$_3$ | 38.7 | 69.5 |
| SiCl$_4$ | 44.4 | — |
| MeSiCl$_3$ | 13.4 | 24.2 |
| MeSiHCl$_2$ | 3.5 | 6.3 |

*including SiCl$_4$,
**without SiCl$_4$

F3) 0.07 ml of a methylhydridodisilane mixture (disilane distribution as depicted in Table 10), 0.21 ml SiCl$_4$ (1.8 mmol), 0.3 ml diglyme and 0.05 ml C$_6$D$_6$ were admixed together with catalytic amounts of phosphonium chloride (0.02 mmol) in an NMR tube. The NMR tube was cooled to −196° C., evacuated and sealed. The sample was heated for 4 hours at 80° C. and analyzed by NMR spectroscopy (Table 11).

TABLE 10

Disilane distribution of the starting disilane mixture.

| silane | mol % |
|---|---|
| (MeH$_2$Si)$_2$ | 43 |
| (Me$_2$HSi)$_2$ | 31 |
| MeH$_2$Si—SiHMe$_2$ | 19 |
| Me$_3$Si—SiHMe$_2$ | 5 |
| Me$_3$Si—SiH$_2$Me | 2 |

TABLE 11

Product distribution of the reaction of a disilane mixture with SiCl$_4$

| silane | mol % |
|---|---|
| HSiCl$_3$ | 52 |
| SiCl$_4$ | 16 |
| MeSiCl$_3$ | 15 |
| MeSiHCl$_2$ | 6 |
| (Me$_2$ClSi)$_2$ | 4 |
| H$_2$SiCl$_2$ | 4 |
| Me$_2$SiCl$_2$ | 3 |

The experiment described under F3) unambiguously links together the Müller-Rochow-Direct Process for methylchlorosilane production (Si+MeCl/Cu cat./350° C.→Me$_n$SiCl$_{4-n}$ (n=1-3)) and the Siemens Process for silicon deposition. Considering the Direct Process Residue consisting of methylchlorodisilanes Me$_n$Si$_2$Cl$_{6-n}$ (n=2-6) that needs to be recycled into valuable monosilanes under smooth reaction conditions for improving economic benefit and to reduce environmental pollution, it is suggested to (i) transfer the methylchlorodisilanes into their methylhydrido substituted congeners by conventional reduction routes (e.g. with LiAlH$_4$ with retention of the disilane skeleton or with LiH and simultaneous cleavage of highly chlorinated disilanes Me$_n$Si$_2$Cl$_{6-n}$ (n<4) into the corresponding hydrido-substituted monosilanes and (i) the addition of excess SiCl$_4$ to the hydrido-(di)-silane mixture. Simultaneous disilane cleavage/SiCl$_4$ reduction and methylchlorosilane formation (as exemplarily depicted in Table 11) gives most valuable monosilanes in excellent yields, e.g. HSiCl$_3$ besides MeSiHCl$_2$.

All experiments performed and listed in Table 2 as well as the syntheses of trichlorosilane in preparative scales were run according to the stoichiometric requirements for a defined product formation. As mentioned earlier, the transformation of tetrachlorosilane into trichlorosilane occurred in an excellent selectivity regarding the monohydrogenation of SiCl$_4$ that was mostly used in a molar excess of 20-50% to prevent higher degrees of hydrogenation forming di- and/or monochlorosilanes. The SiCl$_4$ hydrogenation with Et$_2$SiH$_2$ (Table 2, entry x) clearly shows that the high molar excess of SiCl$_4$ is not necessary for HSiCl$_3$ formation. The excess used in our experiments was caused by safety requirements to prevent the principally possible formation of explosive monosilane, SiH$_4$, by full hydrogenation of tetrachlorosilane. The low boiling points of especially H$_3$SiCl (−30° C.) and SiH$_4$ (−112° C.) could have caused explosions of the glass ampoules or—even worse—the NMR tubes during measurements.

G) One Step Synthesis of HSiCl$_3$ from SiCl$_4$ Under n-Bu$_4$PCl Catalysis

Tetrachlorosilane (0.4 ml), diglyme (0.3 ml), C$_6$D$_6$ (0.05 ml) and n-Bu$_4$PCl (1 w %) were filled with a substoichiometric amount of lithium hydride (LiH, 4.3 mg) in an NMR tube under inert conditions. The reaction mixture was frozen (liquid N$_2$, −196° C.), evacuated and the NMR tube sealed in vacuo. After warming to r.t. the sample was heated to 100° C. for 10 h. The $^{29}$Si NMR analysis proved selective formation of HSiCl$_3$ (conversion rate SiCl$_4$/HSiCl$_3$=100%). The molar ratio SiCl$_4$/HSiCl$_3$ was 85/15. Notably, formation of hydridosilanes H$_n$SiCl$_{4-n}$ (n=2-4) could not been detected, but should have been expected. Monosilane formation from SiCl$_4$ and LiH (W. Sundermeyer, DE1080077, 1957; W. Sundermeyer, L. M. Litz, Chem. Ing. Tech 1965, 37, 14-18; H. J. Klockner, M. Eschwey, Chem. Ing. Tech. 1988, 60, 815-821) gives the perhydrogenated silane lacking any selectivity. Thus, in our case SiH$_4$ (in situ formed) reduces excess SiCl$_4$ to give HSiCl$_3$ selectively.

H) Synthesis of HSiCl$_3$ from SiCl$_4$ with Pentachlorodisilane (PCDS, HSi$_2$Cl$_5$) with Different Catalysts Tetrachlorosilane (0.2 ml), pentachlorodisilane (0.2 ml), diglyme (0.2 ml) and C$_6$D$_6$ (0.05 ml) were admixed with different catalysts (0.02 mol) (as depicted in Table 12) in an NMR tube under inert conditions. The reaction mixtures were frozen (liquid N$_2$, −196° C.), evacuated and the NMR tubes sealed in vacuo. After letting the samples reach r.t. they were heated to 80° C. for 10 h. The results of the $^{29}$Si NMR analyses are depicted in Table 12.

TABLE 12

Hydrogenation of SiCl$_4$ with PCDS.

| silane | catalyst | SiCl$_4$/HSiCl$_3$ conversion rate | molar ratio SiCl$_4$/HSiCl$_3$ |
|---|---|---|---|
| PCDS | n-Bu$_4$PCl | 100% | 65/35 |
|  | n-Bu$_3$P | 100% | 63/37 |
|  | n-Bu$_3$N | 100% | 65/35 |

In all experiments SiCl$_4$-monoreduction was selective with conversion rates SiCl$_4$/HSiCl$_3$ of 100%. Chlorination of PCDS should yield hexachlorodisilane (Si$_2$Cl$_6$) that is subsequently cleaved to give tetrachlorosilane, SiCl$_4$, by the catalysts used (C. J. Wilkins, J. Chem. Soc. 1953, 3409-3412; J. Inorg. Nucl. Chem. 1964, 26, 409-414; J. Tillmann, H.-W. Lerner, M. Wagner, DE102015105501A1, 2016) for reduction.

I) Synthesis of HSiCl$_3$ from SiCl$_4$ and Et$_2$SiH$_2$ in the Presence of nBu$_4$PCl and Benzene as Solvent For a detailed study about the role of stoichiometry in the monoreduction of tetrachlorosilane a set of experiments was performed. Exemplarily, Et$_2$SiH$_2$ was reacted with SiCl$_4$ to give HSiCl$_3$ and Et$_2$SiCl$_2$ in C$_6$D$_6$ as solvent and under nBu$_4$PCl catalysis. According to the stoichiometry required for quantitative reactions, in experiment a) SiCl$_4$ and Et$_2$SiH$_2$ were reacted in a molar ratio of 2:1, in b) SiCl$_4$ was reacted in about 6 mol % excess and in experiment c) Et$_2$SiH$_2$ was used in 12 mol % excess for preparation of HSiCl$_3$. The experiments were performed in sealed NMR tubes and controlled NMR spectroscopically with increasing reaction temperatures and times. The results obtained are depicted in Table 12.

Preparation of a stock solution: 1.00 ml (7.7 mmol) Et$_2$SiH$_2$ were admixed with 1.80 ml (15.5 mmol) SiCl$_4$ and 2.8 ml benzene as solvent.

In the first of three competitive experiments, 0.6 ml of the stock solution and catalytic amounts of nBu$_4$PCl (5 wt %) were admixed in an NMR tube that was cooled to −196° C. The NMR tube was evacuated and sealed (exp. a). In the second experiment (analogously prepared to exp. a), 0.1 mmol of SiCl$_4$ (b) and in the third experiment 0.1 mmol of Et$_2$SiH$_2$ were additionally added. The three samples were heated to 80° C. and analyzed by NMR spectroscopy after 3, 6 and 30 h reaction time, respectively (Table 13).

TABLE 12

Selective conversion of SiCl$_4$ to HSiCl$_3$ with Et$_2$SiH$_2$ and benzene as solvent.

| | a | | | b (+SiCl$_4$) | | | c (+Et$_2$SiH$_2$) | | |
|---|---|---|---|---|---|---|---|---|---|
| silane | 3 h, 80° C. | 6 h, 80° C. | 30 h, 80° C. | 3 h, 80° C. | 6 h, 80° C. | 30 h, 80° C. | 3 h, 80° C. | 6 h, 80° C. | 30 h, 80° C. |
| HSiCl$_3$ | 56.7 | 59.7 | 61.9 | 56.8 | 60.6 | 61.6 | 59.9 | 58.2 | 58.2 |
| H$_2$SiCl$_2$ | 3.0 | 5.8 | 6.0 | 2.8 | 4.1 | 4.2 | 8.5 | 10.0 | 9.1 |
| Et$_2$SiCl$_2$ | 18.3 | 24.0 | 25.9 | 18.9 | 23.8 | 25.1 | 26.7 | 27.6 | 28.5 |
| Et$_2$SiHCl | 9.2 | 2.5 | — | 6.9 | 1.4 | — | — | — | — |
| SiCl$_4$ | 12.9 | 8.1 | 6.2 | 14.6 | 10.1 | 9.1 | 4.9 | 4.2 | 4.2 |
| ratio HSiCl$_3$/ H$_2$SiCl$_2$ | 95/5 | 91/9 | 91/9 | 95/5 | 94/6 | 94/6 | 88/12 | 85/15 | 86/14 |

As expected, reacting equimolar amounts of Et$_2$SiH$_2$ and SiCl$_4$ (exp. a) the final molar ratio HSiCl$_3$/H$_2$SiCl$_2$ was 91/9 with still 6 mol % of SiCl$_4$ remaining. With excess SiCl$_4$ (exp. b) the final ratio HSiCl$_3$/H$_2$SiCl$_2$ was 94/6 and with excess hydridosilane the HSiCl$_3$/H$_2$SiCl$_2$ ratio was the lowest being 86/14. The series of experiments indeed prove that an increasing molar excess of SiCl$_4$ dominantly prevents double or even threefold hydrogenation and thus increases the SiCl$_4$→HSiCl$_3$ selectivity and conversion rates experimentally. Notably, comparable trends were formed running the experiments in diglyme as solvent.

J) Synthesis of HSiCl$_3$ from SiCl$_4$, Et$_2$SiH$_2$ and nBu$_4$PCl (without Solvent)

0.6 ml (5.2 mmol) SiCl$_4$ were admixed with 0.17 ml (1.3 mmol) Et$_2$SiH$_2$ and 0.05 g (0.17 mmol) nBu$_4$PCl in an NMR tube. The NMR tube was cooled to −196° C., evacuated and sealed. The sample was heated to 80° C. for 5 h and analyzed NMR spectroscopically. The product mixture consisted of 32.8% HSiCl$_3$, 45.9% SiCl$_4$, 11.7% Et$_2$SiCl$_2$, 9.3% Et$_2$SiHCl and 0.3% H$_2$SiCl$_2$. Further heating of the sample at 80° C. (additional 7 h) gave 42.0% HSiCl$_3$, 36.6% SiCl$_4$, 20.8% Et$_2$SiCl$_2$, and 0.6% H$_2$SiCl$_2$.

Advantages of the Invention

1) Products formed can be separated by distillation at normal pressure considering the boiling points:
HSiCl$_3$ b.p. 32° C., Me$_2$SiCl$_2$ b.p. 70° C., MeSiCl$_3$ b.p. 60° C., Me$_3$SiCl b.p. 57° C., Me$_2$SiHCl b.p. 35° C.

2) Reactants such as Me$_n$SiCl$_{4-n}$ (n=1-3) and SiCl$_4$ are liquids that can be easily purified by conventional distillation—often SiCl$_4$ is already hyper pure from the Siemens Process—thus, HSiCl$_3$ obtained is highly pure. As HSiCl$_3$ quality in the technical process is strongly dependent from grain size and impurities, higher qualities are easily obtained from pre-cleaned starting materials.

3) SiCl$_4$/HSiCl$_3$ conversions conventionally worked at high temperatures (~1000° C.) or under metal silicide catalysis (600° C.) and conversion rates of about 20% and 4-7%, respectively. The process claimed is by far energy saving (see Table 2, reactions at r.t.→80° C., some hours) and is characterized by extremely high conversion rates SiCl$_4$/HSiCl$_3$.

4) The "hydrogen shuttles" Me$_n$SiH$_{4-n}$ (n=1-3) are easily available for silicon consuming companies running the Müller Rochow Direct Process (Si+MeCl (Cu cat., $\Delta$T)→Me$_n$SiCl$_{4-n}$, n=1-3; n=2: ~90%). This is especially true for the main product Me$_2$SiCl$_2$.

5) Hydrogenation of Me$_n$SiCl$_4$, (n=1-3) is possible with all common reducing agents, such as alkaline and earth alkaline hydrides or complex metal hydrides, e.g. LiAlH$_4$ or NaBH$_4$. Most preferred is LiH, reductions are performed quantitatively (A. N. Kornev, V. V. Semenov, Metalloorg. Khim. 1991, 4, 860-863). LiCl formed by chlorosilane reductions is simply recycled in a LiCl/KCl melt electrolysis to give Li metal that is reacted with hydrogen gas at elevated temperatures to give LiH. Summarizing the Me$_2$SiCl$_2$→Me$_2$SiH$_2$→Me$_2$SiCl$_2$ cycle, Me$_2$SiH$_2$ is the hydrogen shuttle that is not consumed but easily recycled. LiH (or other reducing agents) are the "real" agents for monohydrogenation of SiCl$_4$→HSiCl$_3$, otherwise impossible to perform.

6) The stepwise chlorination of hydridosilanes RSiH$_3$ and R$_2$SiH$_2$, which is dependent from the reaction conditions and the hydrogenation catalysts used (see Table 2) allows the simultaneous formation of organochlorosilanes RSiHCl$_2$ and especially Me$_2$SiHCl. In no cases "triple" hydrogenation of SiCl$_4$ into H$_3$SiCl is observed; never the explosive SiH$_4$ formed (like e.g. in redistribution reactions of HSiCl$_3$ or hydrogenation of SiCl$_4$ with tin hydrides). Thus, a reaction Me$_2$SiH$_2$+SiCl$_4$→Me$_2$SiHCl+HSiCl$_3$ is of high economic value. This process is highly economical and can be used in the silicone industry as well as for silicon deposition. As most of the silicon consuming companies are running both Direct Processes (Müller Rochow and Siemens) the process might be easily included into the major product streams. Additionally, all the included consumers are well equipped with highly developed distillation equip- ment to pre-purify the starting materials for production of highly pure products, e.g. HSiCl₃ and Me₂SiHCl.

The invention claimed is:

1. A process for the preparation of trichlorosilane (HSiCl₃) comprising reacting tetrachlorosilane (SiCl₄) with at least one hydridosilane in the presence of at least one catalyst, wherein the hydridosilanes are selected from the group consisting of MeSiH₃, Me₃SiH, Me₂SiH₂, Et₂SiH₂, Me₂SiHCl, PhSiH₃, Ph₂SiH₂, PhMeSiH₂, iPr₂SiH₂, Hex₂SiH₂, tBu₂SiH₂, Me₂Si(OEt)H, ViSiH₃, ViMeSiH₂, Me₂HSi—SiHMe₂, MeH₂Si—SiH₂Me, MeH₂Si—SiHMe₂, Me₃Si—SiHMe₂, and Me₃Si—SiH₂Me.

2. A process for the preparation of trichlorosilane (HSiCl₃) comprising reacting tetrachlorosilane (SiCl₄) with at least one hydridosilane in the presence of at least one catalyst, wherein the at least one catalyst is selected from the group consisting of:
one or more compounds of the formula R¹₄QZ, wherein R¹ is independently chosen from hydrogen or an organyl group, Q is nitrogen, arsenic, antimony or bismuth, and Z is halogen,
one or more phosphines of the formula R¹₃P, wherein R¹ is as defined above,
one or more alkali metal halides, and
one or more an alkaline earth metal halides.

3. The process of claim 1, comprising reacting tetrachlorosilane with dimethylsilane according to the reaction equations (I) or (II):

(I), (II).

4. The process according to claim 1, which is carried out at a temperature in the range of about −40° C. to about 250° C.

5. The process according to claim 1, which is carried out at a pressure from about 0.1 to about 10 bar.

6. The process according to claim 1, which is carried out under inert conditions.

7. A process for the preparation of trichlorosilane (HSiCl₃) comprising reacting tetrachlorosilane (SiCl₄) with at least one hydridosilane in the presence of at least one catalyst, wherein the at least one hydridosilane is selected from the group consisting of formulae:

(1), and (2), wherein
R is an organic group,
X is halogen or alkoxy,
n is 0 to 3,
m is 0 to 2, and
n+m=0 to 3,
o is 0 to 5,
p is 0 to 5, and
o+p=1 to 5 further comprising hydrogenating the resulting chlorosilanes to hydridosilanes of the formulae (1) or (2), and recycling said hydridosilanes into the reaction with tetrachlorosilane.

8. The process according to claim 7, which is carried out in the presence of R¹₄QZ, wherein R¹ is an organyl group, Q is nitrogen, and Z is chlorine.

9. The process according to claim 7, which is carried out in the presence of at least one solvent.

10. The process according to claim 7, wherein the hydrogenating step is carried out with at least one hydrogenation agent selected from the group consisting of metal hydrides.

11. The process according to claim 1, which comprises
A) reacting tetrachlorosilane with dimethylsilane according to the reaction equation (I) or (II):

(I)

(II), in the presence of a catalyst of the formula R¹₄QZ, wherein R¹ is an organyl group, Q is phosphorus or nitrogen, and Z is chlorine,
B) separating the HSiCl₃ and Me₂SiCl₂ or Me₂SiHCl from the reaction mixture,
C) hydrogenating the Me₂SiCl₂ or Me₂SiHCl or part thereof (which means that not the entire amount of Me₂SiCl₂ or Me₂SiHCl is subjected to hydrogenating) with at least one metal hydride, to form Me₂SiH₂,
D) recycling the Me₂SiH₂, into step A).

12. The process according to claim 1, wherein the selectivity of the formation of HSiCl₃, defined as Molar amount of HSiCl₃ formed/molar amounts of all hydrogenated silanes formed (ΣH₁₋₄SiCl₀₋₃, wherein the sum of number of hydrogen atoms and chlorine atoms adds up to 4)×100 is at least about 90%.

13. The process according to claim 1, wherein the molar ratios of the at least one hydridosilanes to tetrachlorosilane (SiCl₄) is in the range of about 0.05 to about 2.

14. The process according to claim 1,
wherein the at least one hydridosilane is formed in situ from chlorosilanes and LiH.

15. The process according to claim 1, which is carried out in the absence of at least one solvent.

16. The process according to claim 7, wherein the hydrogenating step is carried out with at least one hydrogenation agent chosen from LiAlH₄, LiH, CaH₂ or LiH which is formed in situ by admixture of LiCl and NaH, and subsequently heating said mixture resulting from the admixture of LiCl and NaH to a temperature in the range of about 60° C. to about 200° C.

17. The process according to claim 7, wherein R is chosen from a C1 to C6 alkyl group, and X is chlorine or bromine.

* * * * *